(12) United States Patent
Cho

(10) Patent No.: US 8,321,266 B2
(45) Date of Patent: Nov. 27, 2012

(54) ADVERTISEMENT PROVIDING SYSTEM AND AN ADVERTISEMENT PROVIDING METHOD

(75) Inventor: Hong-Goo Cho, Seoul (KR)

(73) Assignees: Hong-Goo Cho, Seoul (KR); Myoung Lee, Busan (KR)

( * ) Notice: Subject to any disclaimer, the term of this patent is extended or adjusted under 35 U.S.C. 154(b) by 237 days.

(21) Appl. No.: 12/784,079

(22) Filed: May 20, 2010

(65) Prior Publication Data

US 2010/0262485 A1 Oct. 14, 2010

Related U.S. Application Data

(62) Division of application No. 12/159,900, filed on Jul. 2, 2008.

(30) Foreign Application Priority Data

| Jan. 5, 2006 | (KR) | 10-2006-0001225 |
| Apr. 12, 2006 | (KR) | 10-2006-0033140 |

(51) Int. Cl.
*G06Q 40/00* (2012.01)

(52) U.S. Cl. ... 705/14; 705/7.33; 705/14.19; 705/14.35; 705/14.41; 705/14.44; 705/14.45; 705/14.49; 705/14.52; 705/14.53; 705/14.54; 705/14.64; 705/14.66; 705/14.73; 725/34; 725/36; 725/86; 707/10

(58) Field of Classification Search .......... None
See application file for complete search history.

(56) References Cited

U.S. PATENT DOCUMENTS

| 5,848,396 | A | * | 12/1998 | Gerace | 705/7.33 |
| 5,966,696 | A | * | 10/1999 | Giraud | 705/14.41 |
| 6,141,010 | A | | 10/2000 | Hoyle | |
| 6,876,974 | B1 | * | 4/2005 | Marsh et al. | 705/14.44 |
| 8,046,797 | B2 | * | 10/2011 | Bentolila et al. | 725/46 |
| 2002/0082910 | A1 | * | 6/2002 | Kontogouris | 705/14 |
| 2002/0120564 | A1 | * | 8/2002 | Strietzel | 705/40 |
| 2003/0046159 | A1 | * | 3/2003 | Ebrahimi et al. | 705/14 |
| 2003/0069788 | A1 | * | 4/2003 | Han | 705/14 |
| 2003/0120542 | A1 | * | 6/2003 | Arning | 705/14 |
| 2003/0145323 | A1 | * | 7/2003 | Hendricks et al. | 725/34 |

(Continued)

FOREIGN PATENT DOCUMENTS

WO WO97/43724 * 11/1997

(Continued)

OTHER PUBLICATIONS

Dedrick, A Consumption Model for Targeted Electronic Advertising, IEEE Multimedia, Summer 1995, pp. 41-49 (Intel Architecture Labs), Summer, 1995.*

*Primary Examiner* — Robert Niquette

(74) *Attorney, Agent, or Firm* — Lexyoume IP Meister, PLLC.

(57) ABSTRACT

The present invention relates to an advertisement information providing system and an advertisement information providing method. According to the present invention, when a data addresser transmits data to a data addressee through a data transmitting server of a network service medium or when the data addressee receives data from the data addresser through a data receiving server of the network service medium, an advertisement matched with the field of interests of which the data addresser and the data addressee are the most interested is generated in real-time and the generated advertisement is transmitted to the data addresser or the data addressee.

20 Claims, 18 Drawing Sheets

U.S. PATENT DOCUMENTS

| | | | |
|---|---|---|---|
| 2004/0204997 A1* | 10/2004 | Blaser et al. | 705/14 |
| 2006/0212353 A1* | 9/2006 | Roslov et al. | 705/14 |
| 2007/0061328 A1* | 3/2007 | Ramer et al. | 707/10 |
| 2007/0204308 A1* | 8/2007 | Nicholas et al. | 725/86 |
| 2007/0208619 A1* | 9/2007 | Branam et al. | 705/14 |
| 2007/0244750 A1* | 10/2007 | Grannan et al. | 705/14 |
| 2008/0126205 A1* | 5/2008 | Evans et al. | 705/14 |
| 2009/0012859 A1* | 1/2009 | Czeszynski et al. | 705/14 |
| 2009/0265245 A1* | 10/2009 | Wright | 705/14.66 |
| 2010/0094710 A1* | 4/2010 | Ramakrishna | 705/14.64 |
| 2011/0208582 A1* | 8/2011 | Hoyle | 705/14.49 |

FOREIGN PATENT DOCUMENTS

WO      WO 00/33224 A1      6/2000

* cited by examiner

FIG. 16

Example for generating multipart mail with added ad data

From: cho@from1.co.jp
To: kim@to1.co.jp
Cc: lee@cc1.co.jp
Subject: Been to a spa.

Hi, I've been to a spa.

---

From: Example for an ad satisfying addresser preference

From: admin@system.co.jp
To: cho@from1.co.jp
Subject: Transmission finish checking mail Thanks for using.

Point ad
Agaricus mushroom for cancer prevention
http://www.agarikus.com/adid&us From — User preference info
001 Health food
002 Cars
003 Ski
004 Baduk
005 Golf
006 Fishing
007 Tennis
008 Movies
009 Spa
010 Climbing
011 Diet
012 Things Korean
013 Ra-myun
014 Comics
015 K-POP
016 Foreign travel
...

Ad database for health food
① Araricus
② A Korean traditional medicine
③ B Health food
④ C Vitamin

---

To: Example for an ad satisfying addressee

From: cho@from1.co.jp
To: kim@to1.co.jp
Cc: lee@cc1.co.jp
Subject: Been to a spa.

Hi, I've been to a spa.

Point ad :
New products of aPod have been launched.
http://www.ipple.com/apod/adid&userid To : User preference info
001 K-POP
002 Cars
003 Comics
004 Baduk
005 Movies
006 Fishing
007 Tennis
008 Things Korean
009 Foreign travel
010 Climbing
011 Health food
012 Golf
013 Ra-myun
014 Ski
015 Spa
016 Diet
...

Ad database for K-POP
① aPod
② A Album
③ C Music

---

Cc: Example for an ad satisfying addressee

From: cho@from1.co.jp
To: kim@to1.co.jp
Cc: lee@cc1.co.jp
Subject: Been to a spa.

Hi, I've been to a spa.

Point ad :
Community for Porsche lovers
http://www.ilovecar ropsch

Cc User preference info
001 Cars
002 Tennis
003 Things Korean
004 Baduk
005 Golf
006 Fishing
007 K-POP
008 Movies
009 Spa
010 Climbing
011 Health food
012 Ski
013 Ra-myun
014 Comics
015 Diet
016 Foreign travel
...

Ad database for cars
① Car P
② Car N
③ Car H
④ BWM ically, web pages, 25
ADVERTISEMENT PROVIDING SYSTEM AND AN ADVERTISEMENT PROVIDING METHOD

CROSS-REFERENCE TO RELATED APPLICATION

This application is a divisional of application Ser. No. 12/159,900 filed on Jul. 2, 2008, which is the National Stage of International Application No. PCT/KR2007/000072 filed on Jan. 5, 2007, which claims priority to and the benefit of Korean Patent Application Nos. 10-2006-0001225 filed on Jan. 5, 2006 and 10-2006-0033140 filed on Apr. 12, 2006 filed in the Korean Intellectual Property Office, the entire contents of which are incorporated herein by reference.

BACKGROUND OF THE INVENTION (a) Field of the Invention

The present invention relates to an advertisement providing system and method, and particularly, it relates to an advertisement providing system and method for providing an advertisement satisfying a user preference through a network.

(b) Description of the Related Art

As the Internet has been populated very rapidly, web pages, blogs, messengers, and electronic mail as well as the existing newspapers, televisions, and radios have been used as information communication media.

The Internet-based information communication means such as the web pages, blogs, messengers, and electronic mail contain additional advertisement information, and the additional advertisement information is used as the source of income for service providers in a like manner of the conventional newspapers, televisions, and radios.

U.S. Published Application No. US20030069788 discloses a prior art of adding advertisement information by using the Internet.

According to the prior art, a web browser having a moving picture advertisement window is given to a user to use it, and customized advertisements satisfying the user's preference are multicasted to the moving picture advertisement window to maximize the sponsor's advertisement effects. However, according to the prior art, the advertisement effects are improved to some degrees by providing the customized advertisements appropriate for the user preference, but the user preference is fixed with the values that are established at the initial registration, and hence the change of the user preference is not applied in real-time and no great advertisement effects are expected.

SUMMARY OF THE INVENTION

The present invention has been made in an effort to provide an advertisement providing system and method having advantages of generating in real-time an advertisement that matches current interests of a data addresser or a data addressee and adding the generated advertisement to information exchanged between the data addresser and the data addressee.

In one aspect of the present invention, an advertisement information providing system connected to a network service medium through a network is provided, the advertisement information providing system including: a user information database for storing user information including user personal information registered by a user and user preference information that is updated frequently; an advertisement information database for storing advertisement information including advertisement contents, an advertisement ID, and sponsor information; and a real-time advertisement generating system for generating in real-time advertisement information matched with the user's current interested information based on the user's preference information stored in the user information database and the advertisement information stored in the advertisement information database.

The real-time advertisement generating system includes: a user information analyzer for analyzing user preference information based on the browser reading history provided by the user information acquirer and updating the user information database based on the analyzed user preference information; and an advertisement information analyzer for acquiring the user's advertisement data with the highest priority stored in the user information analyzer from the advertisement information database, and updating the priority of the advertisement stored in the advertisement information database.

In another aspect of the present invention, an advertisement information providing method connected to a network service medium through a network is provided, the advertisement information providing method including: (a) requesting to refer to a data addresser from a user information database including user preference information and user registration information and receiving a reference result; (b) acquiring an advertisement category with the highest priority matched with the field of interests of the data addresser and a contents type selected by the data addresser from the user information database; (c) updating the priority of the advertisement category recorded in the user information database; and (d) referring to an advertisement information database storing advertisement data based on the advertisement category with the highest priority and the contents type selected by the data addresser, and acquiring advertisement contents with the highest priority matched with the advertisement category with the highest priority.

In another aspect of the present invention, an advertisement information providing method connected to a network service medium through a network is provided, the advertisement information providing method including: (a) requesting to refer to a data addressee from a user information database including user preference information and user registration information and receiving a reference result; (b) checking whether the data addressee is a permission user based on the data addressee's reference result; (c) acquiring an advertisement category with the highest priority matched with the field of interests of the data addressee and a contents type selected by the data addressee from the user information database when the data addressee is a permission user; (d) referring to an advertisement information database storing advertisement data based on the advertisement category with the highest priority and the contents type selected by the data addressee, and acquiring advertisement contents with the highest priority matched with the advertisement category with the highest priority.

In another aspect of the present invention, an advertisement information providing method connected to a network service medium through a network is provided, the advertisement information providing method including: (a) issuing a user ID based on a user's registration information, and storing the issued ID in the user's local environment; (b) storing the user's registration information including the user's preference information and the issued user ID in a user information database; (c) collecting the user ID stored in the user local environment and the user's browser reading history from a user information acquirer installed in the network service medium; (d) analyzing the browser reading history, and finding an advertisement category of which the user is interested;

(e) receiving user preference information corresponding to the user ID from the user information database; and (f) updating user preference information stored in the user information database based on the advertisement category acquired by analyzing the browser reading history.

BRIEF DESCRIPTION OF THE DRAWINGS

FIG. 15 and FIG. 16 show an example for applying an advertisement adding method according to an embodiment of the present invention to a mail transmission system.

DETAILED DESCRIPTION OF THE EMBODIMENTS

Figure 1:
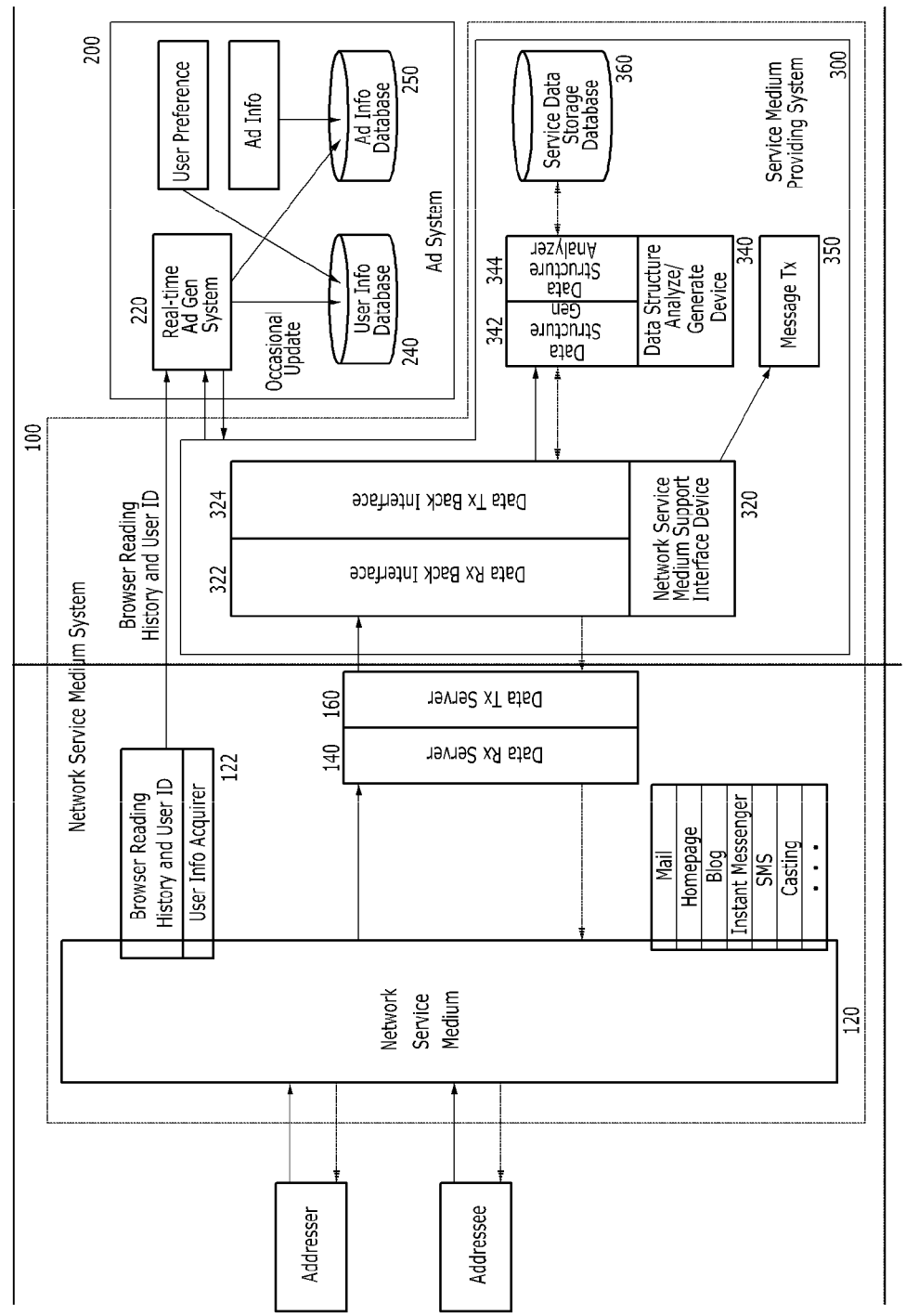
FIG. 1 shows an advertisement providing system according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims which follow, unless explicitly described to the contrary, the word "comprising" or variations such as "comprises" will be understood to imply the inclusion of stated elements but not the exclusion of any other elements. Also, the terms "unit", "module", and "block" in the present specification respectively represent a unit for processing a predetermined function or operation, which can be realized by hardware, software, or a combination of hardware and software.

An advertisement providing system according to an exemplary embodiment of the present invention will now be described with reference to drawings.

FIG. 1 shows a targeting advertisement providing system for a network service medium according to an embodiment of the present invention.

As shown in FIG. 1, the targeting advertisement providing system includes a network service medium system 100, an advertisement system 200, and a service medium providing system 300.

The network service medium system 100 includes a network service medium 120, a data receiving server 140, and a data transmitting server 160.

The network service medium 120 represents the medium used by a data addresser or a data addressee, and includes electronic mail, homepage, blog, messenger, and short message service (SMS). In this instance, the network service medium 120 may include any other types, such as moving picture streaming, still pictures, and voice that are transmitted/received through a network in addition to the above-noted media.

According to the embodiment of the present invention, a user who is a data addresser registers preference information and a desired advertisement contents type (text, freeze frames, moving pictures, and voice), and accepts receiving of an advertisement addition transmission finish checking message from the advertisement providing system according to the embodiment of the present invention when transmitting data through the network service medium 120. Also, according to the embodiment of the present invention, a user who is a data addressee registers preference information and a desired advertisement contents type, and accepts the advertisement providing system's adding advertisement addition data to the data provided to the user through the network service medium 120 used by the user.

A user information acquirer 122 for acquiring browser reading history information is installed in the network service medium 120. In this instance, the browser reading history that is the user's behavioral pattern is automatically collected together with a user ID from the user information acquirer 122 that is preinstalled in an advertisement on the web when the user is connected to a cooperated web site or when the user is exposed to the sponsor's advertisement on the web. The automatically collected browser reading history that is the user's behavioral pattern is used to update user preference information, which will be described later.

The data receiving server 140 receives data through the network service medium 120, and the data transmitting server 160 transmits data through the network service medium 120.

The service medium providing system 300 is provided to the network service medium 120, and includes a network service medium support interface device 320, a data structure analyze/generate device 340, a message transmitter 350, and a service data storage database 360.

The network service medium support interface device 320 is a public system, and is connected to a data transmitting server 160 of the network service medium 120 and to a data receiving server 140 of the network service medium through a network. The network service medium support interface device 320 is provided to the network service medium 120 to thus provide an interface through which the network service medium may freely use the system according to the embodiment of the present invention, and includes a data transmitting server back interface 324 and a data receiving server back interface 322.

The data structure analyze/generate device 340 is connected to the network service medium support interface device 320 through the network, and analyzes the data structure of the provided network service medium according to the request by one of the data transmitting server back interface 324 and the data receiving server back interface 322. The data structure analyze/generate device 340 receives an advertisement generated by a real-time advertisement generating system 220 to generate new advertisement addition data according to the analyzed data structure, and provides the same to one of the data transmitting server back interface 324 and the data receiving server back interface 322. The data structure analyze/generate device 340 directly receives the data ID when the network service medium 120 is the data directly serviced to the user. The data structure analyze/generate device 340 finds data stored in the service data input database 360 and adds a provided real-time advertisement.

The message transmitter 350 is connected to the network service medium support interface device 320 through the network, and transmits an advertisement addition transmission finish checking message to which an advertisement matched with the field of interests of the data addresser to the data addresser according to the request by one of the data transmitting server back interface 324 and the data receiving server back interface 322. In this instance, the advertisement addition transmission finish checking message is transmitted in a like structure of the service data structure of the network service medium 120, and is transmitted in the electronic mail structure when it has a data structure that cannot be transmitted.

The advertisement system 200 includes the real-time advertisement generating system 220, a user information database 240, and an advertisement information database 250.

The user information database 240 stores user information including user preference information and user personal information registered by the user. In this instance, user preference information is frequently updated with the optimized one in linkage with the information acquired from the user's browser reading history extracted by the user information acquirer 122 and is stored in the user information database 240.

The advertisement information database 250 stores advertisement information including a running time, a maximum payable price, and advertisement contents (text, freeze frames, moving pictures, and voice) registered by a sponsor or an advertisement agency requested by the sponsor.

The real-time advertisement generating system 220 is an internal system, is connected to the network service medium support interface device 320 through the network, and generates in real-time an advertisement matched with the field of interests had by the user from the user information database 240 and the advertisement information database 250 according to the request by one of the data transmitting server back interface 324 and the data receiving server back interface 322 of the network service medium support interface device 320. The real-time advertisement generating system 220 provides the generated real-time advertisement to the data transmitting server back interface 324 or the data receiving server back interface 322.

Figure 2:
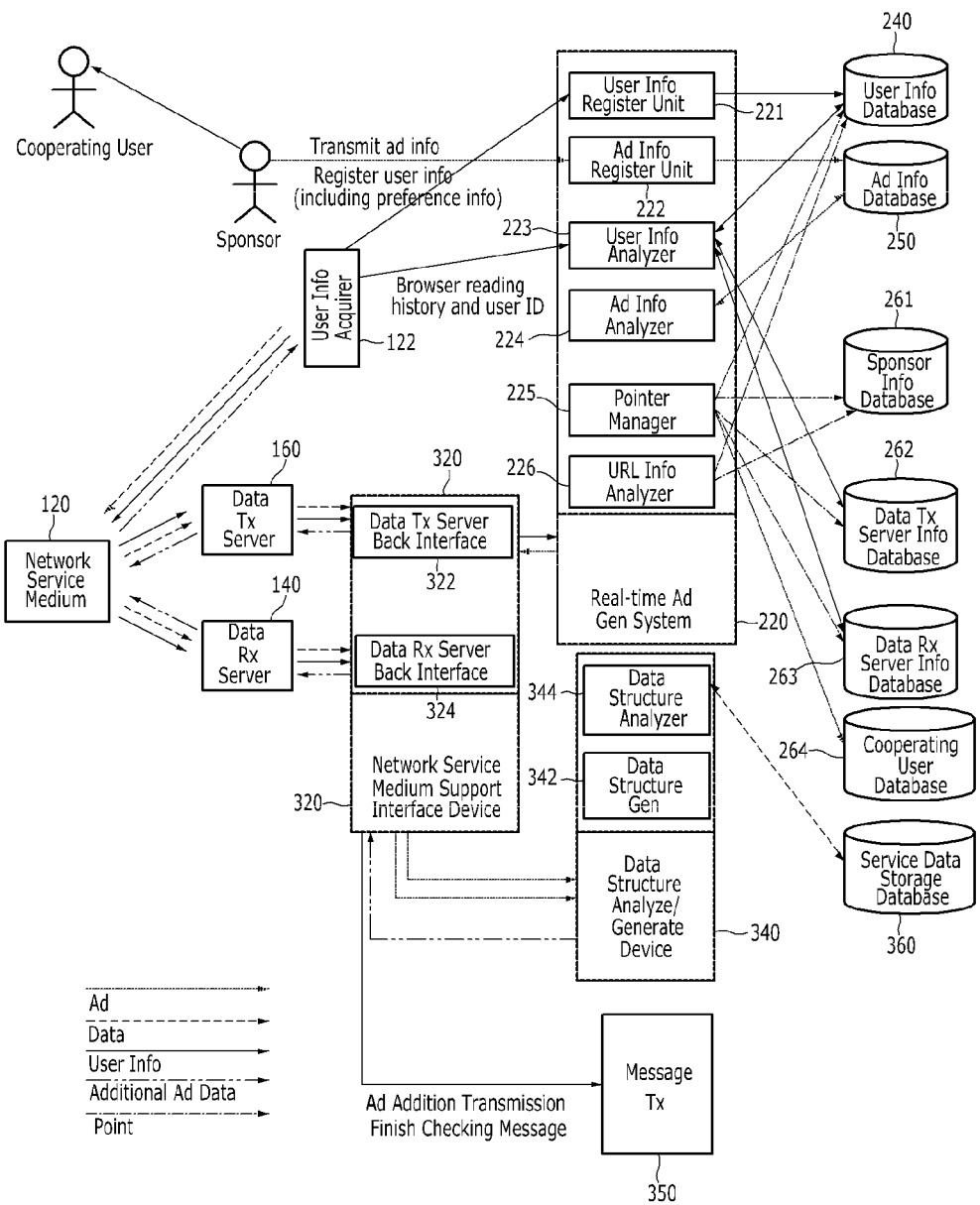
FIG. 2 shows a detailed schematic diagram for the advertisement providing system shown in FIG. 1.

FIG. 2 shows a detailed schematic diagram for the targeting advertisement providing system shown in FIG. 1.

As shown in FIG. 2, the real-time advertisement generating system 220 includes a user information register unit 221, an advertisement information register unit 222, a user information analyzer 223, an advertisement information analyzer 224, a pointer manager 225, and a URL (Uniform Resource Locator) information analyzer 226.

The user information register unit 221 inputs user information including user preference information, and the advertisement information register unit 222 inputs advertisement information.

The user information analyzer 223 analyzes user information such as user preference based on the browser reading history provided by the user information acquirer 122, and updates the user information database 240 based on the analyzed user preference information.

The advertisement information analyzer 224 acquires advertisement data having the highest priority satisfying the data addressee or the data addresser from the advertisement information database 250, and the priority of the advertisement stored in the advertisement information database.

The point manager 225 controls and settles points of the data addresser, data addressee, data server, and sponsor, and the URL information analyzer 226 acquires a user ID included in a link URL and an advertisement site URL from an advertisement ID, provides the acquired advertisement site URL to the user, and adds points to the user and the sponsor when the user accesses an advertisement site.

Also, the advertisement system 200 includes a sponsor information database 261, a data transmitting server information database 262, a data receiving server information database 263, and a cooperating user information database 264.

Referring to FIG. 2, the user information database 240 stores user information including a user ID, a mail address, a mobile phone number, and frequently updated user preference information, and the advertisement information database 250 stores advertisement information including running time, maximum payable price, advertisement contents, advertisement ID, and sponsor.

The sponsor information database 261 stores information on a sponsor who has requested an advertisement, and the cooperating user information database 264 stores cooperating user information.

The data transmitting server information database 262 stores transmitting server information of the network service medium, and the data receiving server information database 263 stores data receiving server information of the network service medium.

The service data storage database 360 of the service medium providing system 300 stores data that are directly serviced to the user by the network service medium.

As shown in FIG. 2, the data structure analyze/generate device 340 includes a data structure analyzer 344 and a data structure generator 342.

The data structure analyzer 344 issues a data ID to the network service medium 120 and analyzes the data structure of the network service medium 120 when the network service medium 120 stores the data directly serviced to the user in the service data storage database 360. The data structure generator 342 generates data according to the data structure of the network service medium 120.

The message transmitter 350 transmits the message with the same structure as the data structure of the network service medium.

Figure 3:
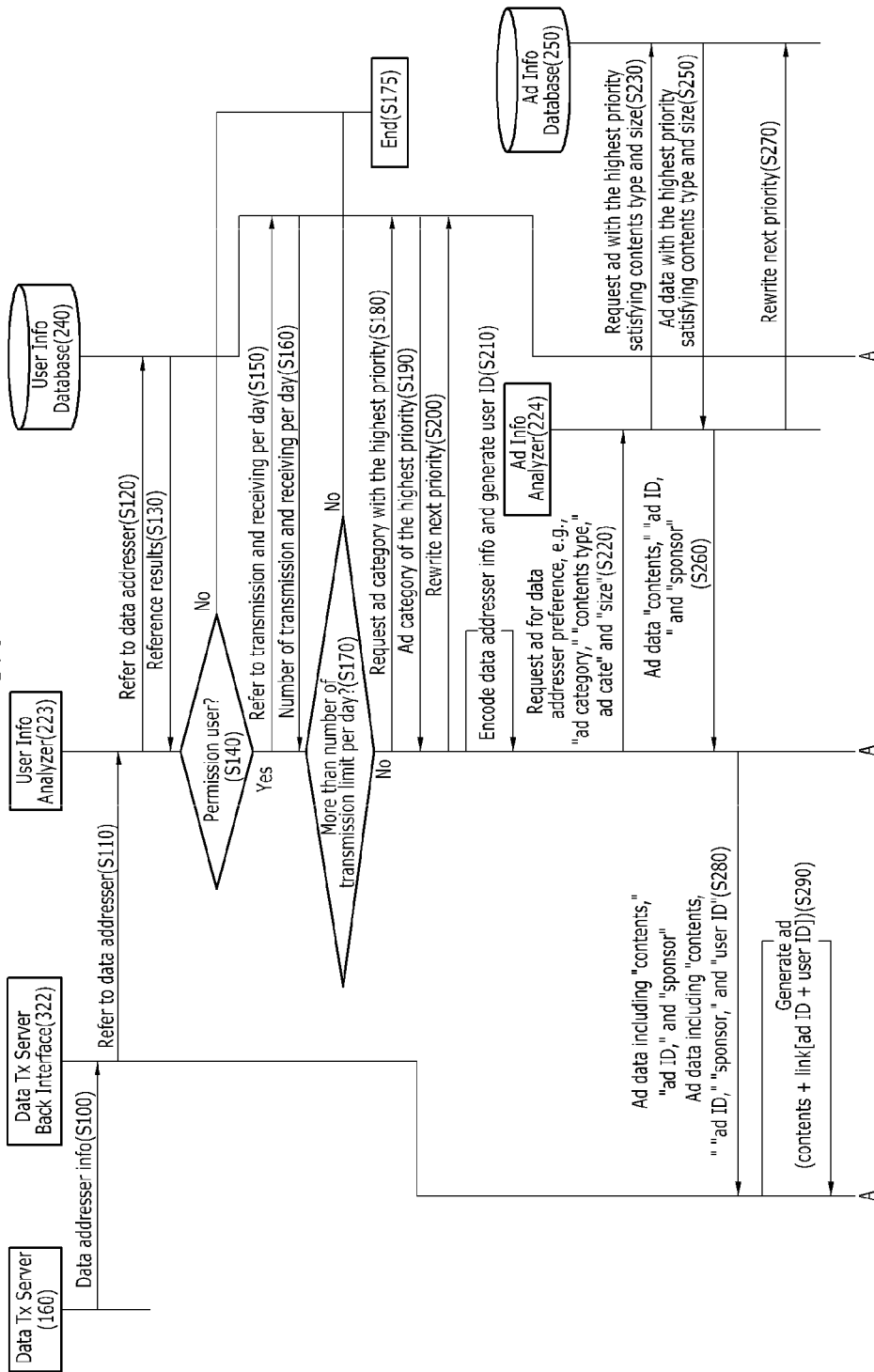
FIG. 3 and FIG. 4 show a process for adding an advertisement having a matched interest field of a data addresser and transmitting the advertisement.
Figure 4:
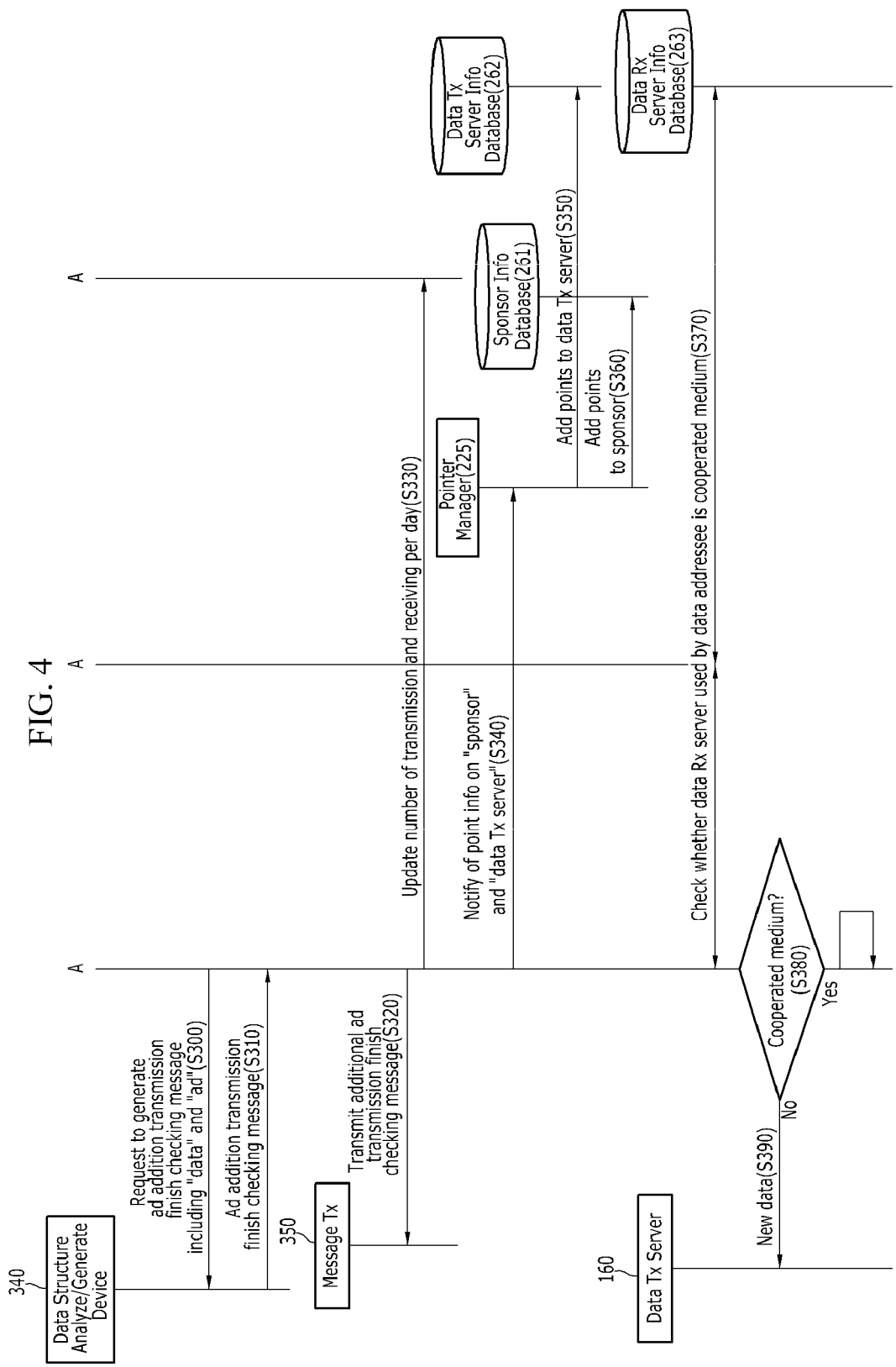

FIG. 3 and FIG. 4 show a process for adding an advertisement having a matched field of interests and transmitting the advertisement to a data addresser.

As shown in FIG. 3, the data transmitting server 160 provides data addresser information to the data transmitting server back interface 322 (S100), and the data transmitting server back interface 322 provides data addresser information to the user information analyzer 223 (S110).

The user information analyzer 223 requests the user information database 240 to inquire the data addresser, and receives an inquiry result. (S120, S130)

The user information analyzer 223 determines whether the data addresser is a permission user based on the inquiry result on the data addresser. (S140)

When the data addresser is not a permission user according to the determination result of the step S140, the user information analyzer 223 informs the data transmitting server back interface 322 of the corresponding fact and no further process is undertaken. (S175)

When the data addresser is a permission user according to the determination result of the step S140, the user information analyzer 223 asks the user information database 150 to check the number of per day transmissions of the data addresser. (S150, S160)

The user information analyzer 223 determines whether the number of per day transmissions of the data addresser exceeds the per day transmission limit based on the number of per day transmissions of the data addresser. (S170)

When the number of per day transmissions of the data addresser exceeds the per day transmission limit according to the determination result of the step S170, the user information analyzer 223 informs the data transmitting server back interface 322 of the corresponding fact, and no further process is undertaken. (S175)

When the number of per day transmissions of the data addresser does not exceed the per day transmission limit according to the determination result of the step S170, the user information analyzer 223 inquires of the user information database 240 to acquire an advertisement category with the highest priority matched with the field of interests of which the data addresser is the most interested and a contents type selected by the data addresser when registering preference information. (S180, S190)

The user information analyzer 223 sets the current highest priority recorded in the user information database 240 to be the lowest one, and advances the priorities after the second priority by one to thus update the priority of the advertisement category with the next priority. (S200) The above-noted priority update will be described later.

The user information analyzer 223 encodes the data addresser information to generate a user ID. (S210) In this instance, the user ID corresponds to that stored in the user's local environment (e.g., a user PC) when the user registers preference information to the user information register unit 221.

The user information analyzer 223 transmits an advertisement category, a contents type, and a size to the advertisement information analyzer 224, and requires the advertisement with the highest priority matches with the field of interests of which the data addresser is the most interested. (S220) The advertisement information analyzer 224 inquires of the advertisement information database 250 to acquire advertisement data with the highest priority corresponding to the data addresser, and provides the advertisement data to the user information analyzer 223. (S230, S250) In this instance, the advertisement data include contents, advertisement ID, sponsor, and user ID.

Also, the advertisement information analyzer 224 sets the current highest priority to be the lowest one, and advances the priorities after the second priority by one to update the priority of the advertisement with the next priority. (S270)

The user information analyzer 223 provides the advertisement data (contents, advertisement ID, sponsor, and user ID) provided by the advertisement information analyzer 224 to the data transmitting server back interface 322. (S280)

The data transmitting server back interface 322 generates an advertisement by linking an advertisement ID and a user ID to the contents of the advertisement data. (S290)

As shown in FIG. 4, the data transmitting server back interface 322 requests the data structure analyze/generate device 340 to generate an advertisement addition transmission finish checking message satisfying the data structure of the network service medium, and receives the advertisement addition transmission finish checking message from the data structure analyze/generate device 340. (S300, S310)

The data transmitting server back interface 322 requests the message transmitter 350 to transmit the advertisement addition transmission finish checking message generated by the data structure analyze/generate device 340 to the data addresser (S320), and updates the number of per day transmissions of the data addresser recorded in the user information database. (S330)

Also, the data transmitting server back interface 322 requests the point manager 225 to add points of the sponsor data transmitting server (S340), and the point manager 225 adds the points of the sponsor and the data transmitting server. (S350, S360)

The data transmitting server back interface 322 checks data receiving server information used by the data addressee from the data receiving server information database 360 through the user information analyzer 223, and determines whether the data receiving server used by the data addressee is a cooperated medium. (S370, S380)

When the data receiving server of the network service medium used by the data addressee is not a cooperated medium according to the determination result of the step S380, the data transmitting server back interface generates data to which advertisement information is added and transmits the data to the data addressee who is a permission user through the data transmitting server 160. (S390) In this instance, it is recommended to use the data receiving server of the network service medium of the cooperated medium.

When the data receiving server of the network service medium used by the data addressee is a cooperated medium according to the determination result of the step S380, no further process is undertaken.

Figure 5:
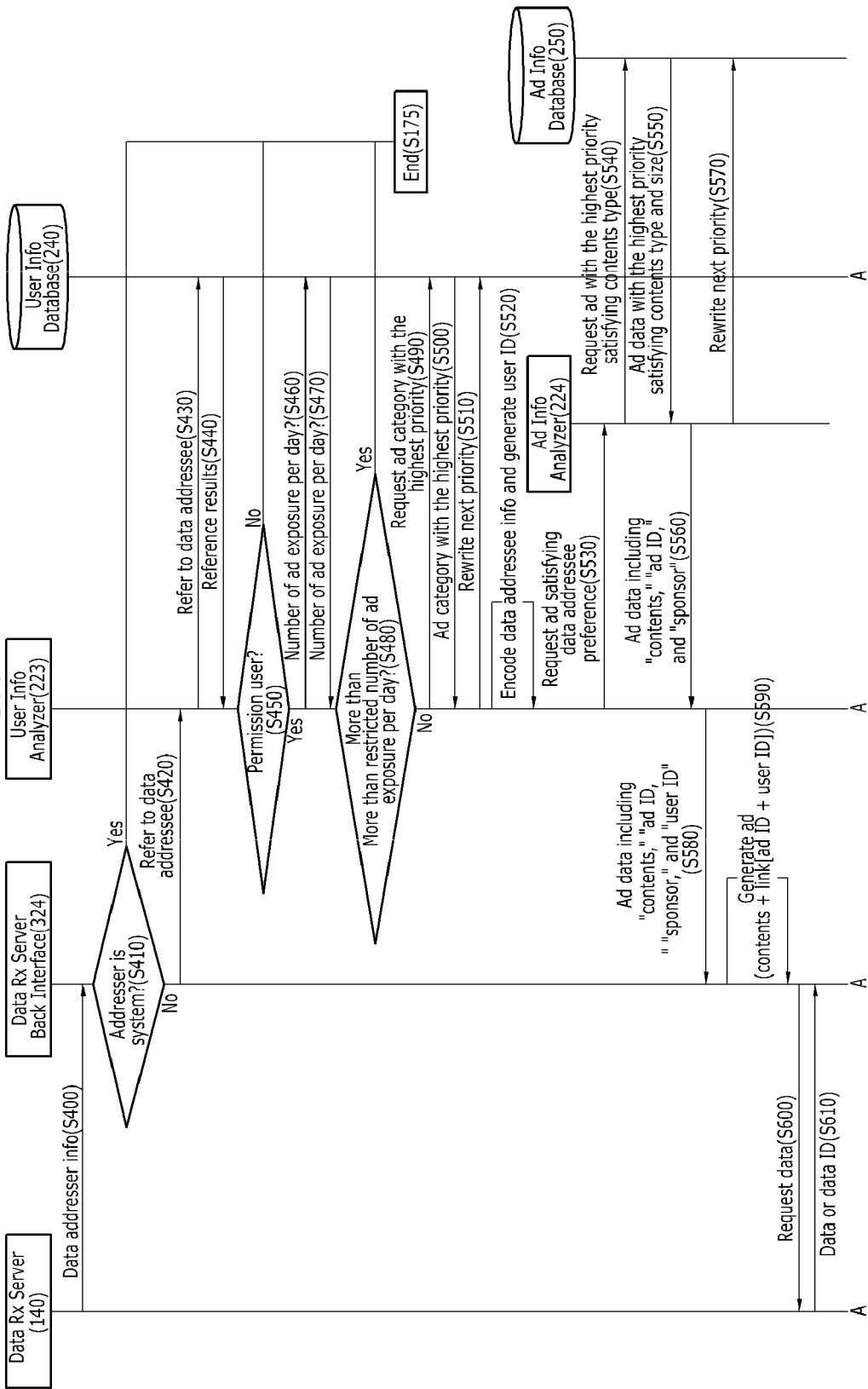
FIG. 5 and FIG. 6 show a process for adding an advertisement having a matched interest field of a data addressee and transmitting the advertisement.
Figure 6:
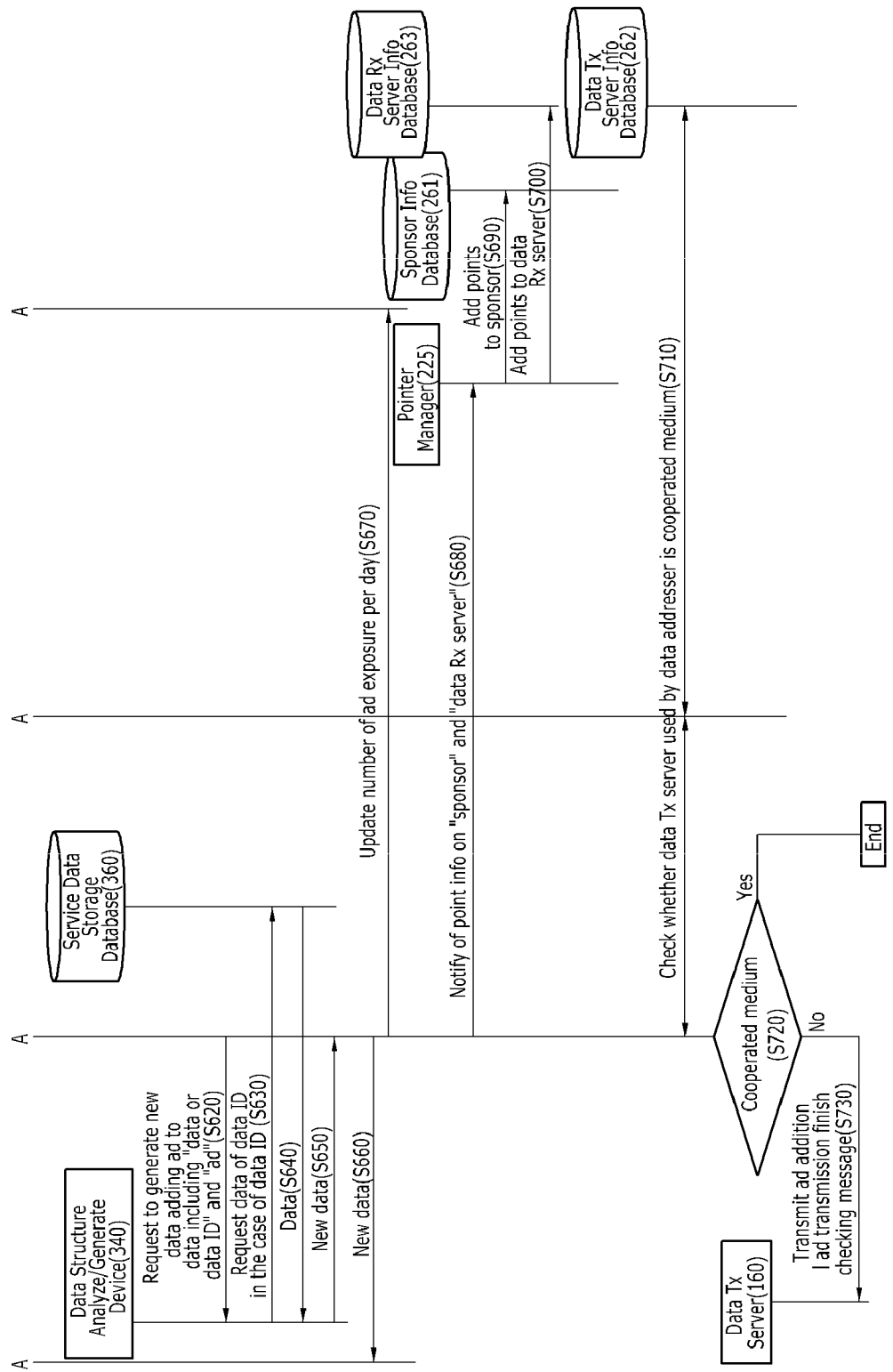

FIG. 5 and FIG. 6 show a process for adding an advertisement having a matched field of interests of the data addressee and transmitting the advertisement to the data addressee.

As shown in FIG. 5, the data receiving server back interface 324 receives data addresser information from the data receiving server 140 (S400), and determines whether the data addresser is a system. (S410)

When the data addresser is a system according to the determination result of the step S410, the data receiving server back interface 324 prevents the advertisement from being posted twice by determining it as an advertisement addition transmission finish checking message transmitted by the system and generating no additional advertisement.

When the data addresser is not a system according to the determination result of the step S410, the data receiving server back interface 324 provides data addressee information received from the data receiving server 140 to the user information analyzer 223 to request to inquire about the data addressee (S420).

The user information analyzer 223 requests the user information database 240 to inquire about the data addressee and receives a corresponding result. (S430, S440)

The user information analyzer 223 determines whether the data addressee is a permission user based on the inquiry result provided by the user information database 240. (S450)

When the data addressee is not a permission user according to the determination result of the step S450, the user information analyzer 223 notifies the data receiving server back interface 324 of the corresponding fact and no further process is undertaken.

When the data addressee is a permission user according to the determination result of the step S450, the user information analyzer 223 requests the user information database 240 to check the number of per day advertisement exposures of the data addressee. (S460, S470)

The user information analyzer 223 determines whether the number of per day advertisement exposures of the data addresser exceeds the per day exposure limit based on the number of per day advertisement exposures of the data addresser. (S480)

When the number of per day advertisement exposures of the data addressee exceeds the per day exposure limit according to the determination result of the step S480, the user information analyzer 223 notifies the data receiving server back interface 324 of the corresponding fact and no further process is undertaken.

When the number of per day advertisement exposures of the data addressee does not exceed the per day exposure limit according to the determination result of the step S480, the user information analyzer 223 inquires of the user information database 240 to acquire an advertisement category with the highest priority matched with the field of interests of which the data addressee is the most interested and a contents type selected by the data addressee when registering preference information. (S490, S500)

The user information analyzer 223 sets the current highest priority recorded in the user information database 240 to be the lowest one, and advances the priorities after the second priority by one to update the priority of the advertisement category with the next priority. (S510)

The user information analyzer 223 encodes data addressee information to issue a user ID. (S520)

The user information analyzer 223 transmits an advertisement category, a contents type, and a size to the advertisement information analyzer 224 to request the advertisement with the highest priority matched with the field of interests of which the data addressee is the most interested. (S530) The advertisement information analyzer 224 inquires of the advertisement information database 250 to acquire advertisement data with the highest priority appropriate for the data addressee, and provides the same to the user information analyzer 223. (S540, S550) In this instance, the advertisement data include contents, advertisement ID, sponsor, and user ID.

The advertisement information analyzer 224 sets the current highest priority to be the lowest one, and advances the priorities after the second priority by one to update the priority of the advertisement with the next priority. (S570)

The user information analyzer 223 provides the advertisement data provided by the advertisement information analyzer 224 to the data receiving server back interface 324. (S580)

The data receiving server back interface 324 generates an advertisement by linking an advertisement ID and a user ID to the contents of the advertisement data. (S590)

The data receiving server back interface 324 requests the data provided by the data addresser who will add an advertisement from the data receiving server 140 of the network service medium. (S600) The data receiving server 140 transmits the data provided by the data addresser to the data receiving server back interface 324. (S610) In this instance, when transmitting service data to the data addressee, the data receiving server 140 provides a data ID received when storing the service data in the service data storage database 360. The data ID is generated and transmitted by the data structure analyze/generate device 340 when the network service medium stores the service data in the service data storage database.

As shown in FIG. 6, the data receiving server back interface 324 requests the data structure analyze/generate device 340 to generate new data that are generated by adding an advertisement to the original data received by the data addressee so that the new data may satisfy the data structure of the network service medium (S620). In this instance, the data structure analyze/generate device 340 finds the data designated by the service data storage database 360 and sets the same to be data to which an advertisement will be added in the case of a data ID. (S630, S640)

The data structure analyze/generate device 340 adds an advertisement to the data received by the addressee and provides them to the data receiving server back interface 324. (S650)

The data receiving server back interface 324 provides the advertisement-added new data generated by the data structure analyze/generate device 340 to the data receiving server 140 of the network service medium, and updates the number of per day advertisement exposures recorded in the user information database. (S670)

The data receiving server back interface 324 requests the point manager 225 to add points of the sponsor and the data receiving server (S680), and the point manager 225 respectively adds the points of the sponsor and the data receiving server. (S690, S700)

The data receiving server back interface 324 checks data transmitting server information used by the data transmitting user from the data transmitting server information database 262 through the user information analyzer 223, and determines whether the data transmitting server used by the data transmitting user is a cooperated medium. (S710, S720)

When the data transmitting server of the network service medium used by the data transmitting user is not a cooperated medium according to the determination result of the step S720, the data receiving server back interface 324 generates data to which advertisement information is added and transmits the data to the data transmitting user who is a permission user through the data transmitting server. (S730) In this instance, it is recommended to use the data transmitting server of the network service medium of the cooperated medium.

When the data transmitting server of the network service medium used by the data transmitting user is a cooperated medium according to the determination result of the step S720, no further process is undertaken.

Figure 7:
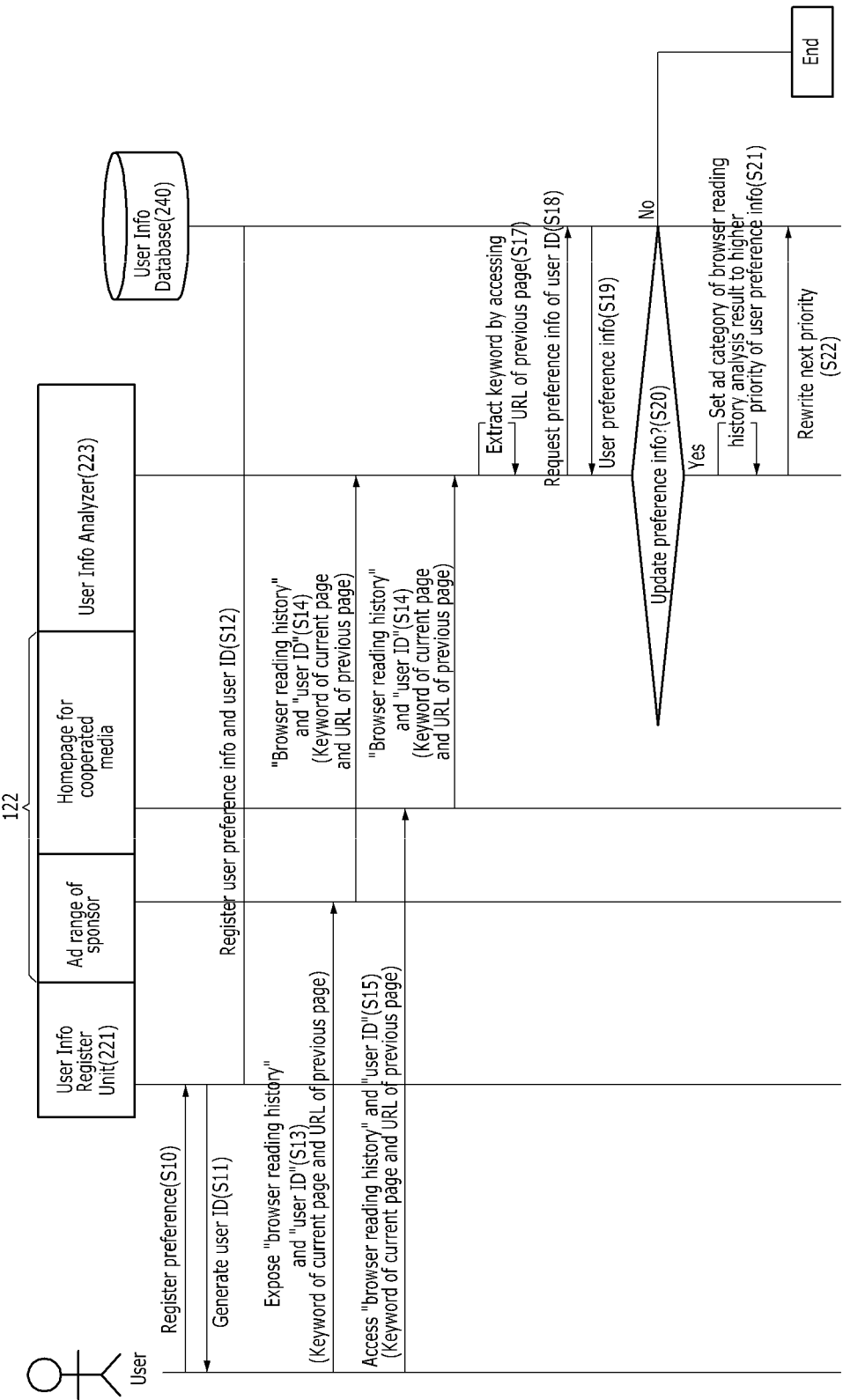
FIG. 7 shows a method for linking the user's browser reading history and user preference information and maintaining the latest user preference information according to an embodiment of the present invention.

FIG. 7 shows a method for linking the user's browser reading history and user preference information and always maintaining the latest user preference information according to an embodiment of the present invention.

The user registers his preference information through the user information register unit 221. (S10) In this instance, the user information register unit 221 encodes a mail address among user registration information and issues a user ID, and stores the issued user ID in the user's local environment. (S11) The user information register unit 221 stores the registered user preference information and the issued user ID in the user information database 240. (S12)

When the user is exposed on the advertisement on the sponsor's web (S13) or is connected to the cooperating user's web site (S15), the user information acquirer 122 preinstalled in the advertisement on the sponsor's web and the cooperating user's web site automatically collects the user ID stored in the user's local environment and the browser reading history and provides the browser reading history and the user ID to the user information analyzer 223. (S14, S16)

The user information analyzer 223 analyzes the browser reading history provided by the user information acquirer 122 to find the advertisement category of which the user is the most interested. (S17) In detail, the user information analyzer 223 extracts a keyword of the current page, accesses the web page having the URL corresponding to the previous page of the browser reading history to extract a keyword, and finds an advertisement category of which the user is interested from the keywords.

The user information analyzer 223 requests the user ID's preference information from the user information database 240 to receive user preference information corresponding to the user ID. (S19)

The user information analyzer 223 determines whether to update preference information based on the advertisement category acquired by analyzing the browser reading history and the user preference information stored in the user information database. (S20)

When it is not needed to update the preference information according to the determination result of the step S20, that is, when the advertisement category generated by analyzing the browser reading history does not correspond to the user preference information stored in the user information database, the analysis result of the browser reading history is ignored.

When it is needed to update the preference information according to the determination result of the step S20, that is, when the advertisement category generated by analyzing the browser reading history corresponds to the user preference information stored in the user information database, the advertisement category of the browser reading history analysis result is set to be higher than the priority of the user preference information. (S21) The current priority is advanced by one to update the priority of the advertisement category with the next priority. (S22)

According to the embodiment of the present invention, the user information analyzer 223 analyzes the information to be acquired from the browser reading history and processes the same as temporary user preference information, and sets the priority of the corresponding preference information to have a higher rank when the temporary user preference information acquired from the browser reading history matches the preference information that is registered in advance.

Figure 8:
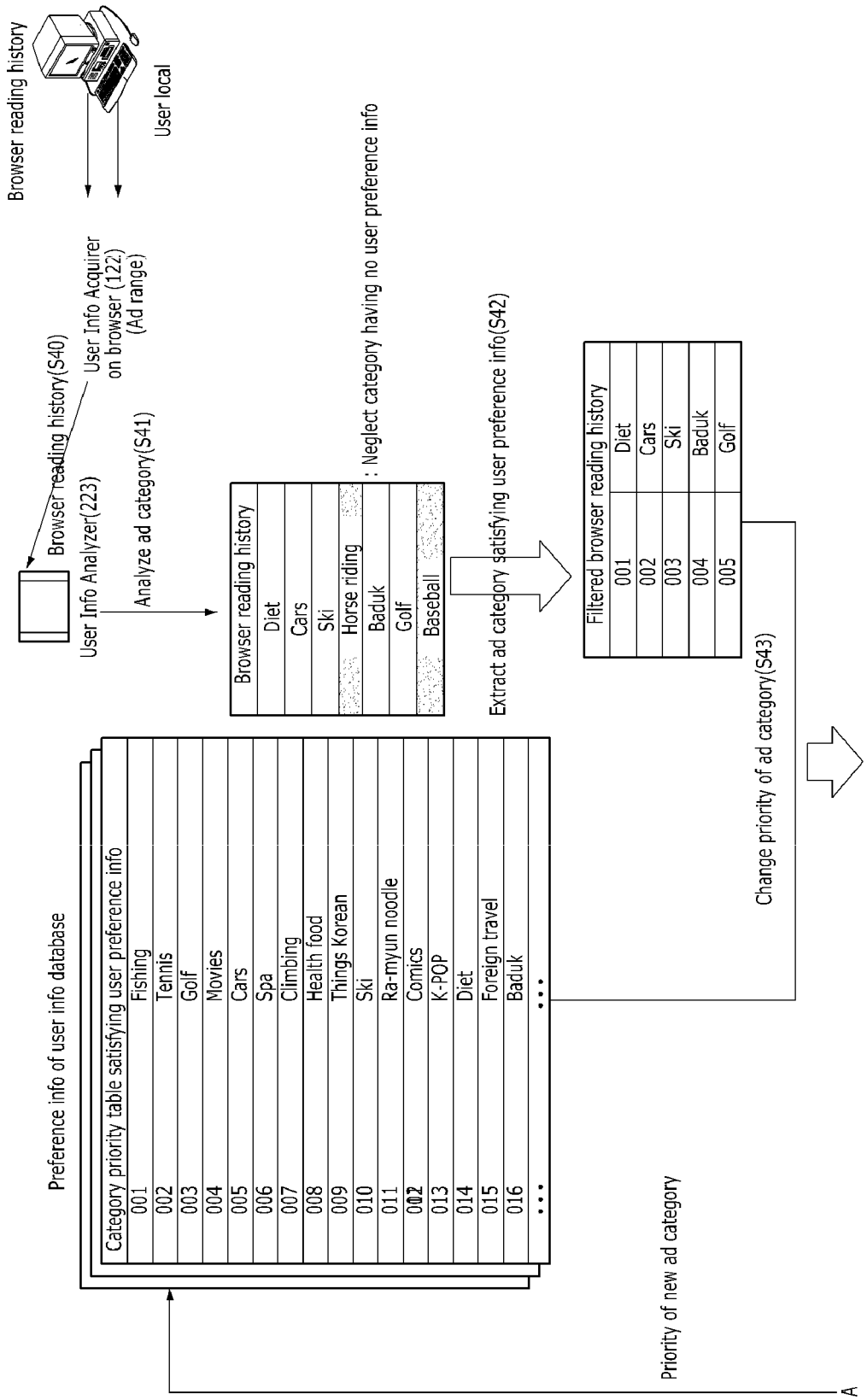
FIG. 8 and FIG. 9 show a process for updating the priority of advertisement categories satisfying changed preference information of the user and the priority of transmitted advertisements.
Figure 9:
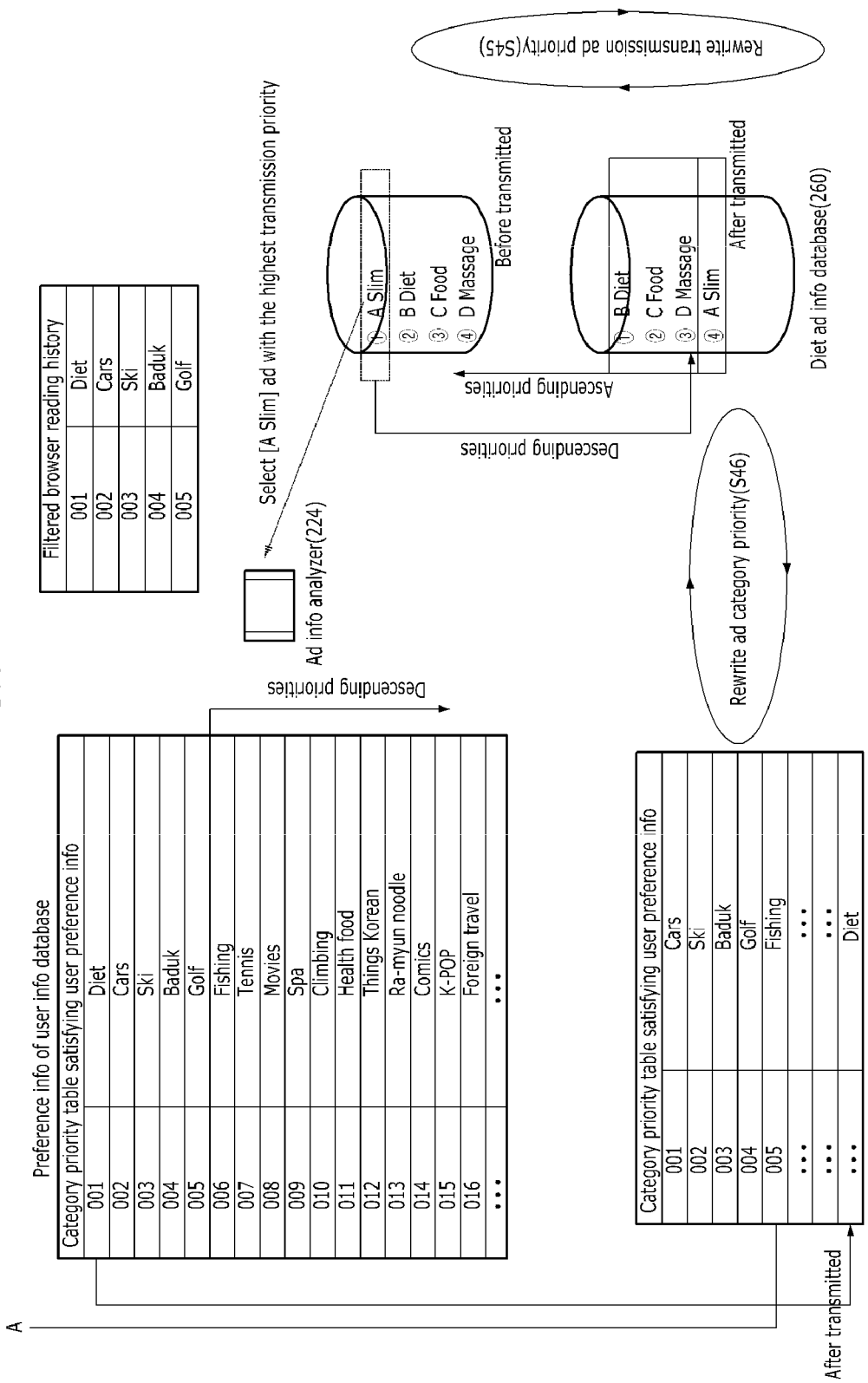

FIG. 8 and FIG. 9 show a process for updating the priority of advertisement categories satisfying changed preference information of the user and the priority of transmitted advertisements.

As shown in FIG. 8, as described above, the user information analyzer 223 analyzes the browser reading history acquired from the user information acquirer 122 and generates an advertisement category table of preference information on recent users. (S41)

The user information analyzer 223 acquires preference information of the user corresponding to the user ID acquired from the user information acquirer 122 from the user information database 240, filters items (horse riding and baseball in FIG. 9) of the advertisement category table that are not registered in the user information database 240 from among user preference information based on the browser reading history, and generates a new filtered advertisement category table. (S42)

The user information analyzer 223 considers the items of the filtered new advertisement category table as items of which the user is the most interested, and updates the existing priorities by sequentially ranking priorities of user preference information in the order of the filtered advertisement category table from the highest one to the lowest one. (S43)

As described with reference to FIG. 3 to FIG. 6, the user information analyzer 223 inquires the advertisement information analyzer 224 to request an advertisement (diet in FIG. 6) of the advertisement category having user preference information with the highest priority.

The advertisement information analyzer 224 selects the advertisement contents ("A Slim" in FIG. 9) having the highest transmission rank of the advertisement table corresponding to the advertisement category (diet) requested by the user information analyzer from among a plurality of advertisement tables stored in the advertisement information database 250, and provides the selected advertisement contents to the user information analyzer 223.

The advertisement information analyzer 224 sets the highest transmission rank of the advertisement contents (A Slim) to be the lowest one, and advances the priorities after the second priority by one to update the transmission priorities. (S45) That is, as shown in FIG. 9, the advertisement information analyzer 224 updates the advertisement information database 250 in the transmission priority of B diet, C food, D massage, and A slim.

On receiving the advertisement of the advertisement category (diet in FIG. 9) having user preference information with the highest priority from the advertisement information analyzer 224, the user information analyzer 223 sets the advertisement category (diet in FIG. 9) with the highest rank stored in the user information database 240 to the lowest one, and advances the priorities after the second priority by one to update the priorities. (S46)

Figure 10:
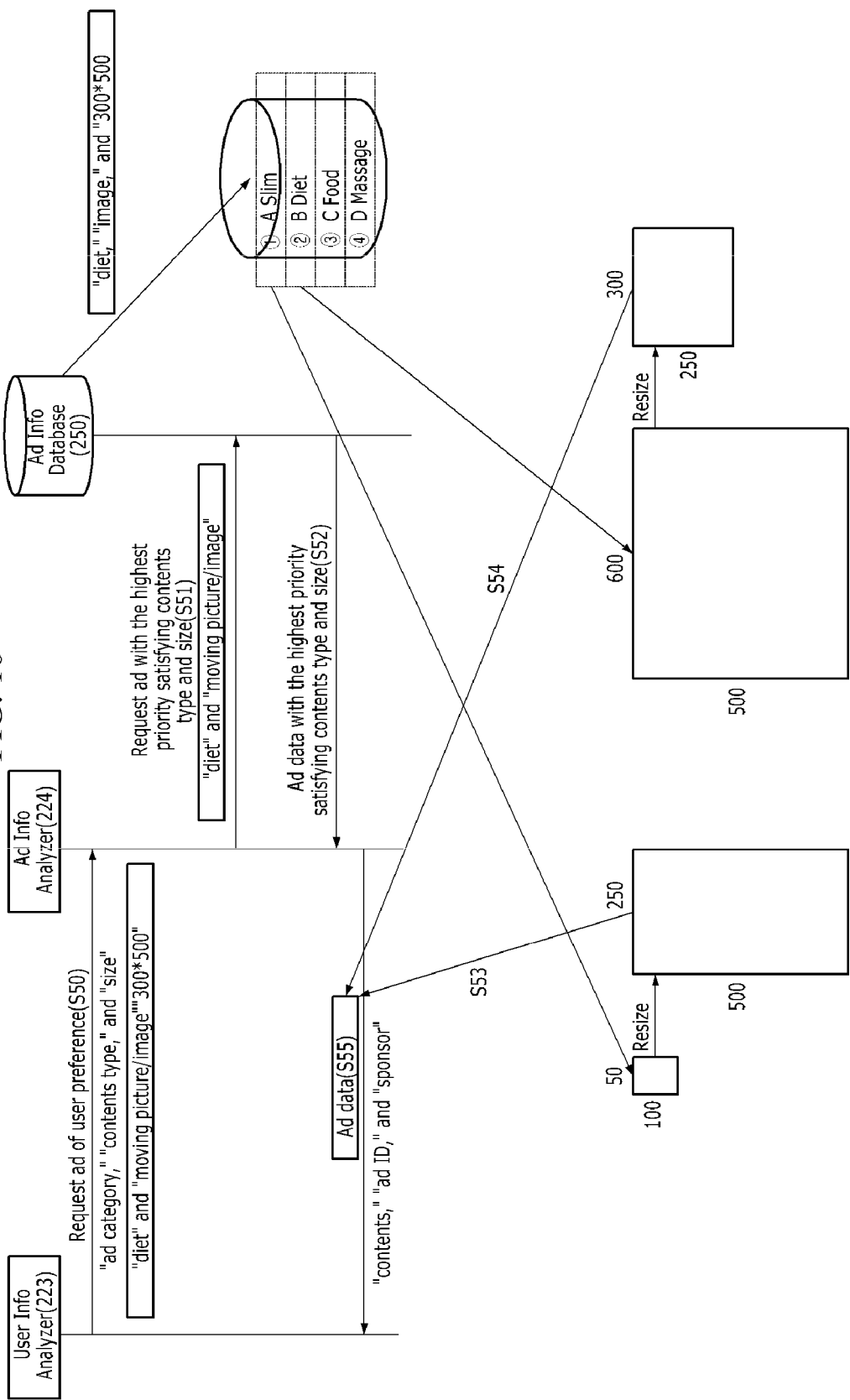
FIG. 10 shows a process for extracting a contents type advertisement designated by a network service medium from an advertisement database.

FIG. 10 shows a process for extracting a contents-type advertisement designated by the network service medium from an advertisement database.

The user information analyzer 223 requests user preference advertisement including an advertisement category (diet), a contents type (moving picture/image), and a size (300*500) from the advertisement information analyzer 224. (S50) The advertisement information analyzer 224 requests an advertisement with the highest priority satisfying the contents type and the size from the advertisement information database 250, and acquires the same. (S51, S52)

The advertisement information analyzer 224 provides size advertisement data corresponding to the size required by the user information analyzer 223 to the user information analyzer 223. (S55) In detail, when there are advertisement contents having the same size as that required by the user information analyzer 223, the advertisement information analyzer 224 provides the same to the user information analyzer 223, and when there are no such contents having the same size, the advertisement information analyzer 224 resizes the contents in correspondence to the required size and then provides the resized contents. (S53, S55) In this instance, the resizing is applied with reference to the smaller extension ratio of length vs. breadth from among that of the contents size provided to the advertisement information database 250 and that of the required size.

For example, when the size of the A Slim 1 provided by the advertisement information database 250 is given 50*100 and the required size is given 300*500 as shown in FIG. 10, the length extension ratio of the required size/A Slim 1 is given as 6 (300/5) and the breadth extension ratio is 5 (500/100), and hence, the resized 250*500 contents with reference to the breadth extension ratio of 5 are provided as advertisement data. (S53)

When the size of the A Slim 2 provided by the advertisement information database 250 is given 600*500 and the required size is given 300*500 as shown in FIG. 10, the length extension ratio of the required size/A Slim 2 is given as 0.5 (300/600) and the breadth extension ratio is 1 (500/500), and hence, the resized 300*250 contents with reference to the length extension ratio of 0.5 are provided as advertisement data. (S54)

Figure 11:
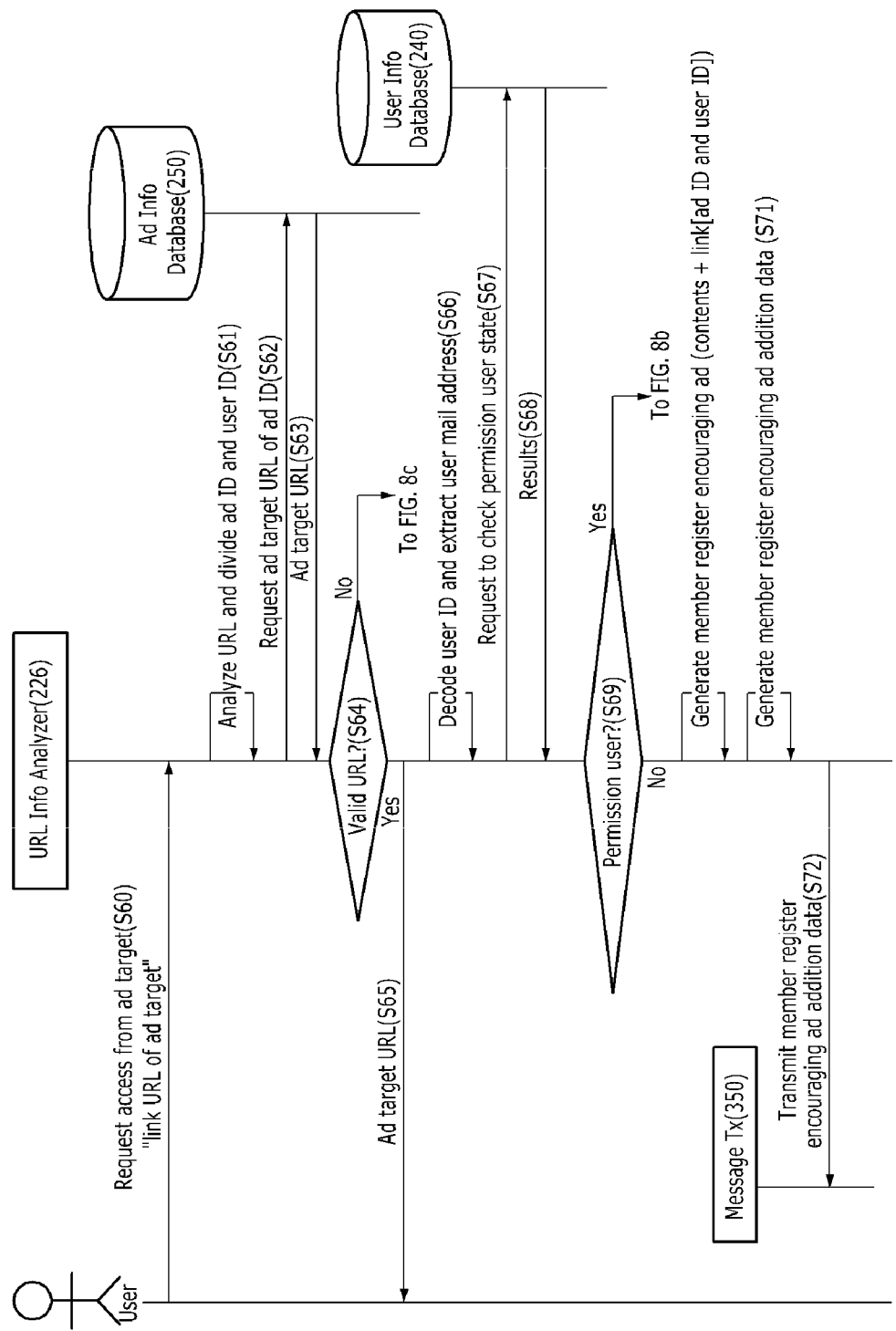
FIG. 11 to FIG. 13 show a process when a user is connected to an advertisement target.
Figure 12:
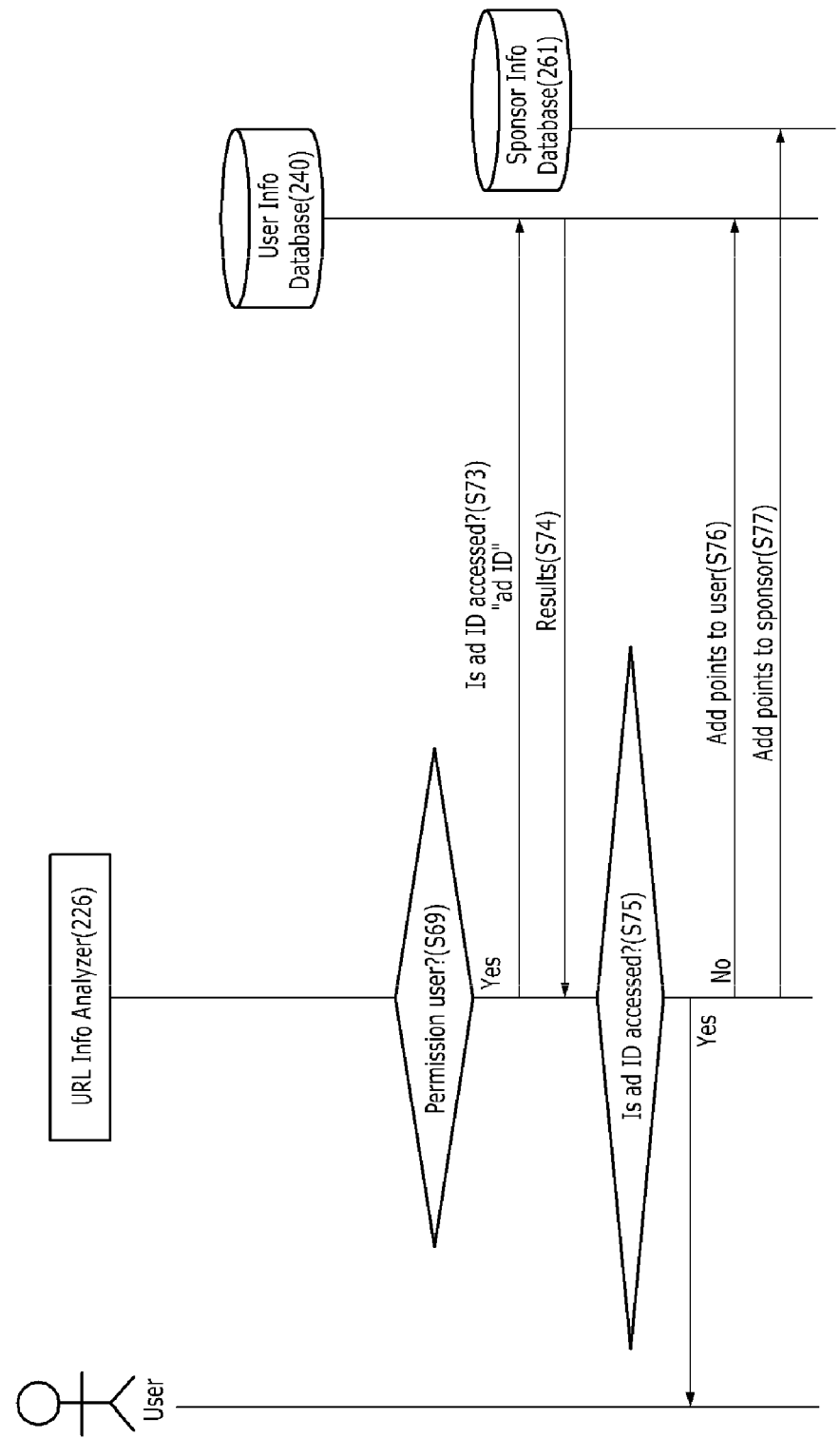
Figure 13:
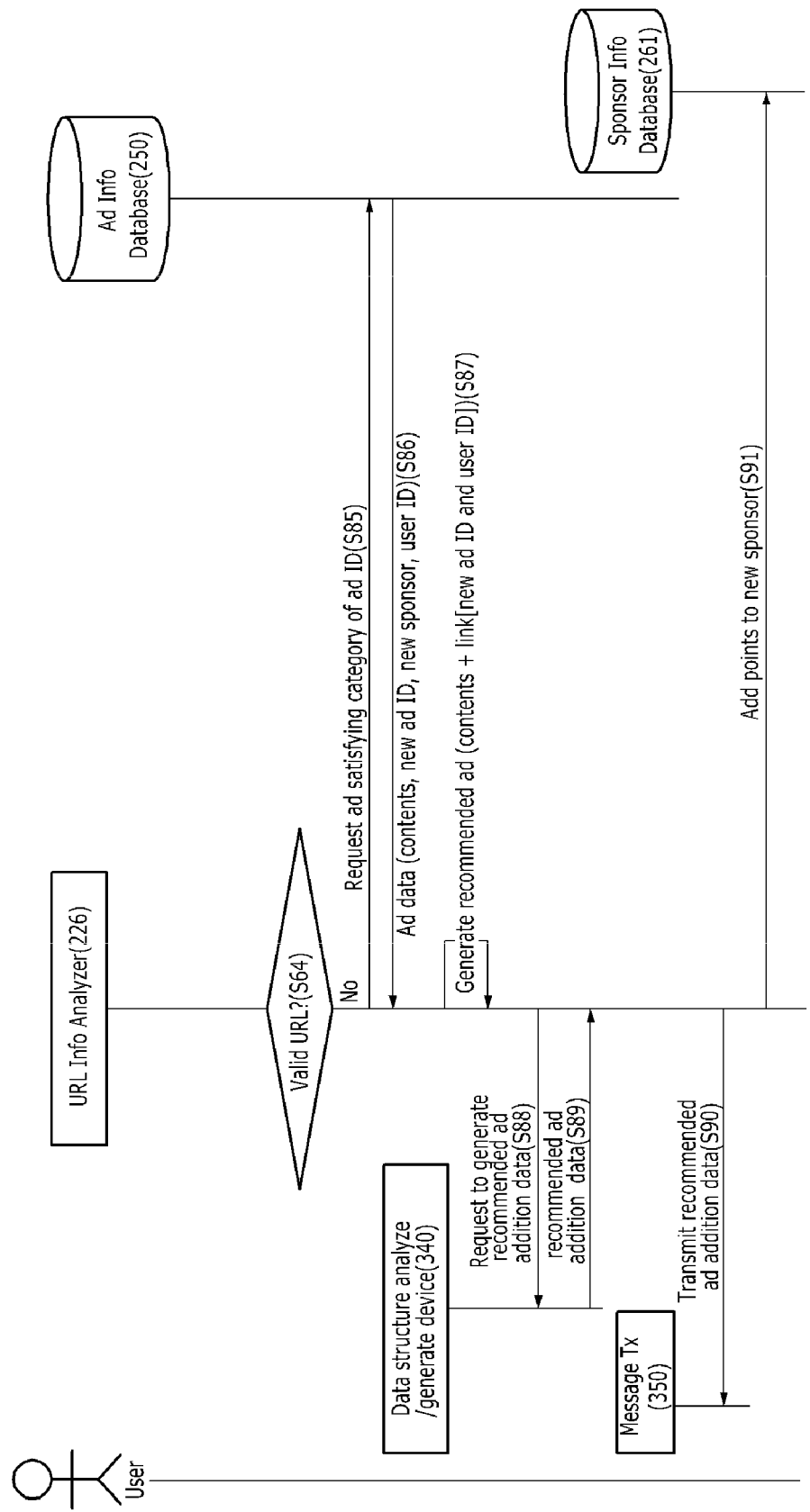

FIG. 11 to FIG. 13 show a process when a user is connected to an advertisement target.

As shown in FIG. 11, the URL information analyzer 226 receives an access request of an advertisement target from the user (S60), and divides and analyzes the advertisement ID and the user ID included in the link URL of the advertisement target. (S61) The URL information analyzer 226 requests an advertisement target URL of the advertisement ID from the advertisement information database 250 (S62), and acquires the advertisement target URL. (S63) The URL information analyzer 226 determines whether the advertisement target URL acquired from the advertisement information database 250 is a valid URL. (S64)

When the result advertisement target URL is a valid URL according to the determination result of the step S64, the URL information analyzer 226 provides the URL of the advertisement target to the user. (S65)

The URL information analyzer 226 decodes the user ID to extract the user's mail address, (S66) and requests information on whether the user ID is a permission user from the user information database 240 and receives a corresponding result. (S67, S68)

The URL information analyzer 226 determines whether the user of the user ID is a permission user (S69), and generates an advertisement for persuading the user to register himself as a member and advertisement addition data and provides them to the message transmitter 350 when he is not a permission user. (S70, S71, and S72)

As shown in FIG. 12, when the permission user has accessed the advertisement target according to the determination result of the step S69, the URL information analyzer 226 inquires of the user information database 240 whether the user has ever accessed the advertisement ID, and receives a corresponding result. (S73, S74) The URL information analyzer 226 determines whether the user has ever accessed the advertisement ID (S75), transmits a corresponding fact to the user when the user has ever accessed the advertisement, and adds points to the user and sponsor when the user has never accessed the advertisement. (S76, S77)

As shown in FIG. 13, when the advertisement target URL is not valid according to the determination result of the step S64, that is, when the posting period of the advertisement target has expired, the URL information analyzer 226 requests an advertisement corresponding to the category of the existing advertisement ID from the advertisement information database 250 (S85), and receives advertisement data including contents, a new advertisement ID, a new sponsor, and a user ID. (S86)

The URL information analyzer 226 requests the data structure analyze and generate device 340 to generate recommended advertisement addition data satisfying the data structure of the network service medium, and receives the generated recommended advertisement addition data. (S88, S89)

The URL information analyzer 226 transmits the recommended advertisement addition data provided by the data structure analyze/generate device 340 to the message transmitter 350 so that the same may be transmitted to the user (S90), and the URL information analyzer 226 accesses the sponsor database 261 and adds points to the sponsor (new sponsor) of the recommended advertisement (S91).

Figure 14:
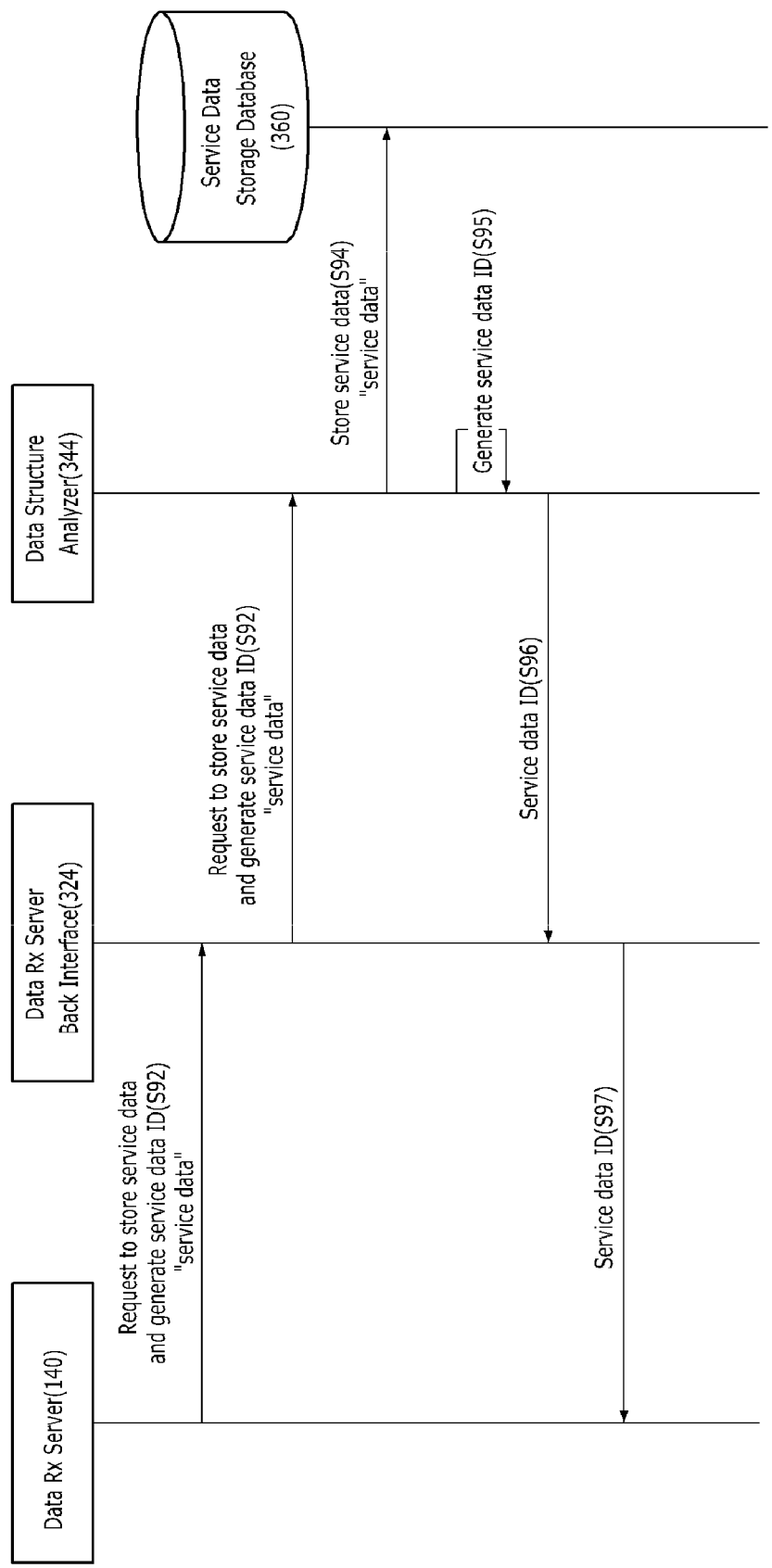
FIG. 14 shows a process for a network service medium to store service data in a service data input database.

FIG. 14 shows a process for a network service medium to store service data into a service data input database.

As shown in FIG. 14, the data receiving server 140 of the network service medium provides service data to the data receiving server back interface 324, and requests to store the service data and issue a service data ID. (S92) The receiving server back interface 324 provides the service data provided by the data receiving server 140 to the data structure analyzer 344 and requests to store the service data and issue a service data ID. (S93)

The data structure analyzer 344 stores the service data in the service data storage database 360 (S94), and issues a service data ID. (S95) The data structure analyzer 344 provides the issued service data ID to the data receiving server 140 through the data receiving server back interface 324. (S96, S97)

An example of applying an advertisement adding method according to an embodiment of the present invention to various network service media (electronic mail, homepages, blogs, messengers, and SMS) will now be described.

Figure 15:
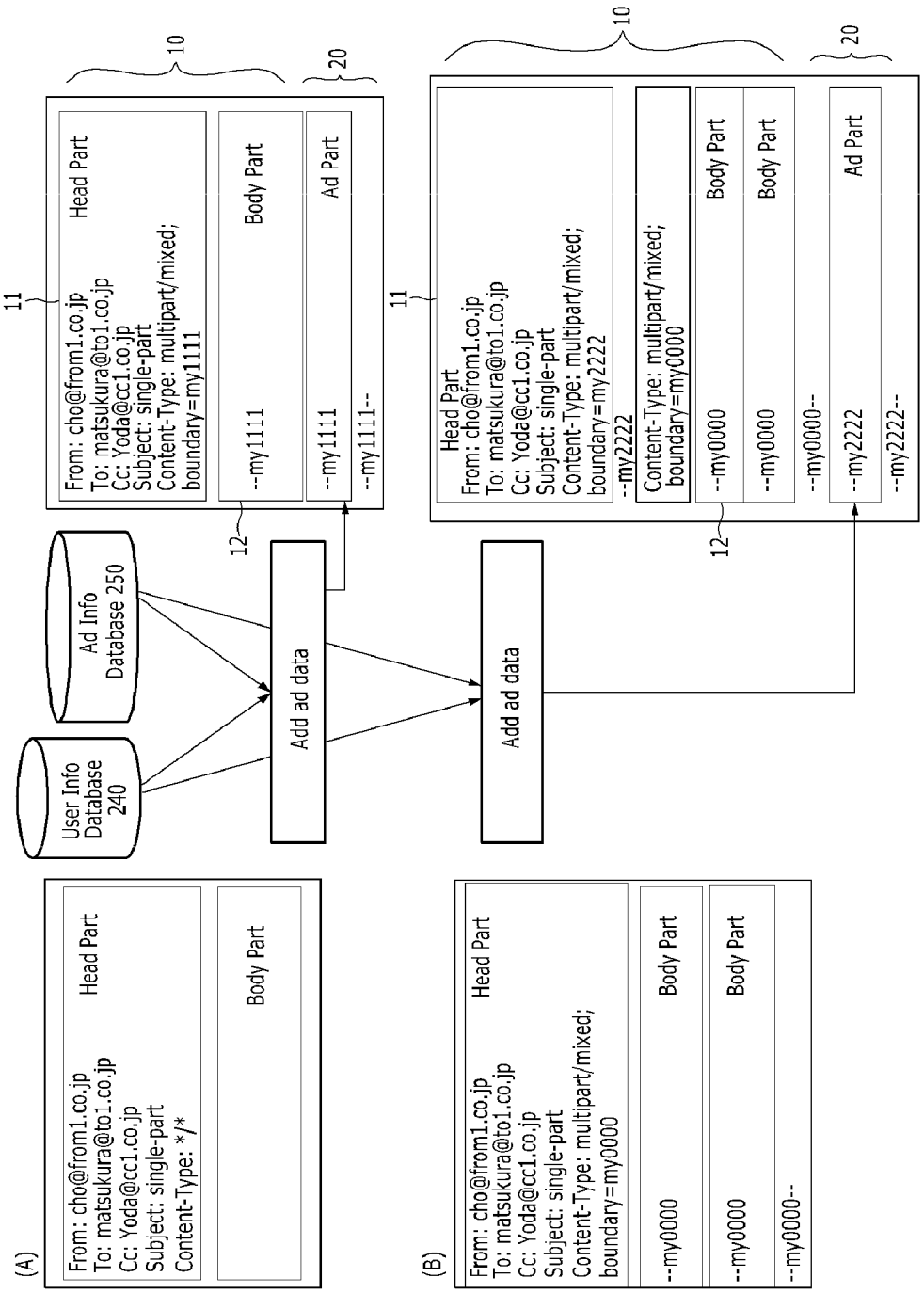

An application of an advertisement adding method according to an embodiment of the present invention to a mail transmission system will now be described. FIG. 15 and FIG. 16 show an example for applying an advertisement adding method according to an embodiment of the present invention to a mail transmission system.

As shown in FIG. 15 and FIG. 16, in the mail transmission system, a data addresser is a mail address user with the [From: ] field, and a data addressee is a mail address user with the [To: ] field (addressee field), the [Cc:]) (reference address field), and the [Bcc: ] field (hidden reference addressee field). In this instance, according to the embodiment of the present invention, the data addressee's mail address includes a mailing list, and a mail address of a member configuring the mailing list can be a target of the data addressee.

According to the embodiment of the present invention, [transmission finish checking] mail to which an advertisement satisfying the mail addresser's preference is added is generated and transmitted to a mail addresser (From: field), and mail to which an advertisement satisfying the mail addressee's preference is added is generated and transmitted to a mail addressee (To: field, Cc: field, and Bcc: field). In this instance, according to the embodiment of the present invention, advertisement added mail to which an advertisement satisfying the mail addressee or mail addresser's preference is added is transmitted based on the latest preference information stored in the user information database 240 and the advertisement contents information stored in the advertisement information database 250.

The advertisement added mail according to the embodiment of the present invention builds multi-parts by adding an advertisement part 20 to the mail part 10 of FIG. 15 based on the RFC 2045-RFC2049 rule. In this instance, the mail part 10 includes a header part 11 for recording an addresser, an addressee, a reference, and a title, and a body part 12 for recording contents.

(A) and (B) of FIG. 15 show an example for generating multi-parts by adding an advertisement part to a single part message, and an example for generating multi-parts by adding an advertisement part to a multi-part message.

FIG. 16 shows a detailed example applied to the mail transmission system. As shown in FIG. 16, the [Health Food] category in the highest rank from among the addresser's preference information stored in the user information database 240 and advertisement contents corresponding to the health food category stored in the advertisement information database 250 are referred, the [Agaricus] advertisement that is the advertisement contents in the highest rank is selected, the selected advertisement is added to transmission finish checking mail, and the mail is then transmitted to the From: field user of the data addresser.

In a like manner, an advertisement [aPod] in the highest rank is selected from among advertisement contents corresponding to the [K-POP] category in the highest rank of preference information, the selected advertisement is added to the mail part, and the mail is then transmitted to the To: field user who is a data addressee. Also, an advertisement of [P car] in the highest rank is selected from among advertisement contents corresponding to the [Cars] category in the highest rank of preference information of the user, the selected advertisement is added to the original mail part, and a resultant mail is transmitted to the CC: field user who is a data addressee.

An application of an advertisement adding method according to an embodiment of the present invention to a homepage will now be described.

According to the embodiment of the present invention, an advertisement space for displaying an advertisement is preset on the homepage, and a user information acquirer 122 for acquiring user information who receives a homepage service is installed in the advertisement space.

The user information acquirer 122 inserts advertisement HTML text provided by the advertisement providing system according to the embodiment of the present invention into an advertisement range at which the user information acquirer 122 is located. In this instance, advertisement insertion text has the structure of <a href="advertisement link">advertisement data</a>, and the web browser analyzes the insertion text and displays an advertisement. In this instance, the displayed advertisement displays an advertisement of advertisement contents (e.g., birds) stored in the advertisement information database corresponding to the advertisement category (e.g., movies) in the highest rank of the user's preference information.

An application of an advertisement adding method according to an embodiment of the present invention to an Internet messenger will now be described.

According to the embodiment of the present invention, an advertisement space for displaying an advertisement is preset in the Internet messenger, and a user information acquirer 122 for acquiring user information on who receives an Internet messenger service is installed in the advertisement space.

According to the embodiment of the present invention, advertisement contents (e.g., an advertisement of the car P) in the highest rank are displayed from among the advertisement contents stored in the advertisement information database corresponding to the advertisement category (e.g., cars) in the highest rank of preference information of the user A is displayed to the user A who is a data addresser. An advertisement of the advertisement contents (e.g., Agaricus) in the highest rank is displayed from among the advertisement contents stored in the advertisement information database corresponding to the advertisement category (e.g., health food) in the highest rank of preference information of the user B is displayed to the user B who is a data addressee.

When the user A and the user B exchange messages, positions of the data addresser and the data addressee are changed with each other, and the advertisement in the highest rank is displayed from among the advertisement contents of the advertisement information database corresponding to the advertisement category in the highest rank of preference information in the case of exchanging the messages based on the process shown in FIG. 3 to FIG. 6.

An application of an advertisement adding method according to an embodiment of the present invention to a short message service (SMS) will now be described.

Figure 17:
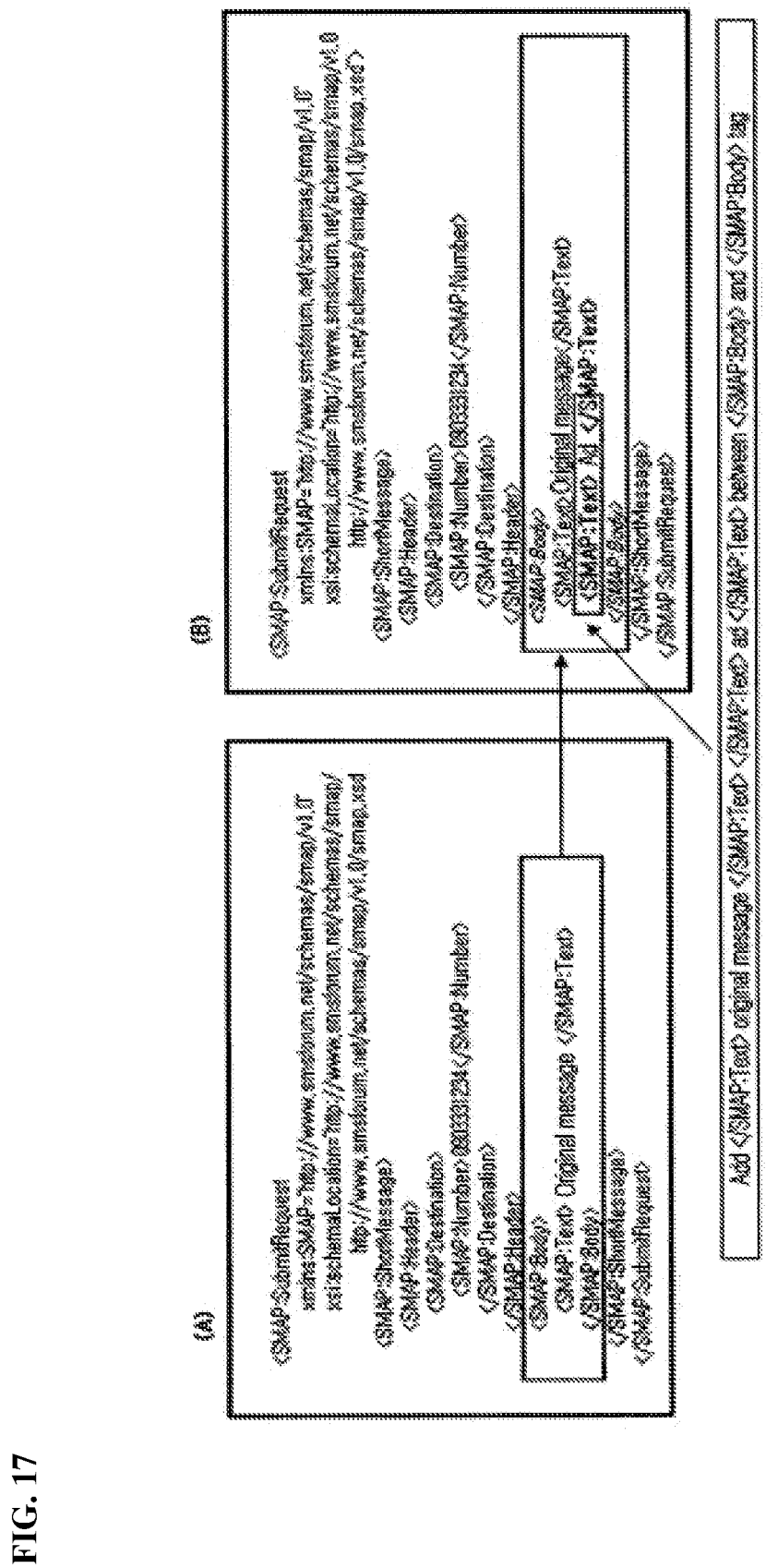
FIG. 17 shows an example for applying an advertisement adding method according to an embodiment of the present invention to a short message service system.

FIG. 17 shows an example for applying an advertisement adding method according to an embodiment of the present invention to a short message service (SMS) system.

The medium for providing a short message service (SMS) to the telephone number of a mobile phone is the network service medium 120 in the embodiment of the present invention, and the SMPP server (SMSC) for receiving SMS data from the mobile phone according to the SMPP protocol is the data transmitting/receiving server of the embodiment of the present invention.

According to the embodiment of the present invention, the data structure analyze/generate device 340 analyzes the SMS data format independently developed by each service provider, adds advertisement data after the message body, and transmits an advertisement to the user receiving the SMS service.

(A) of FIG. 17 shows a message format of the original message, and (B) of FIG. 17 shows a message format to which advertisement data are added and which is then transmitted to the SMS addressee according to the embodiment of the present invention.

As can be known from (B) of FIG. 17, according to the embodiment of the present invention, the <SMAP:Text> original message</SMAP:Text> <SMAP:Text>advertisement</SMAP:Text> is added between the <SMAP:Body> and </SMAP:Body> tags in the SMS message format, and hence, a message to which advertisement data are added is transmitted to the SMS addressee.

An application of an advertisement adding method according to an embodiment of the present invention to a really simple syndication (RSS) will now be described.

Figure 18:
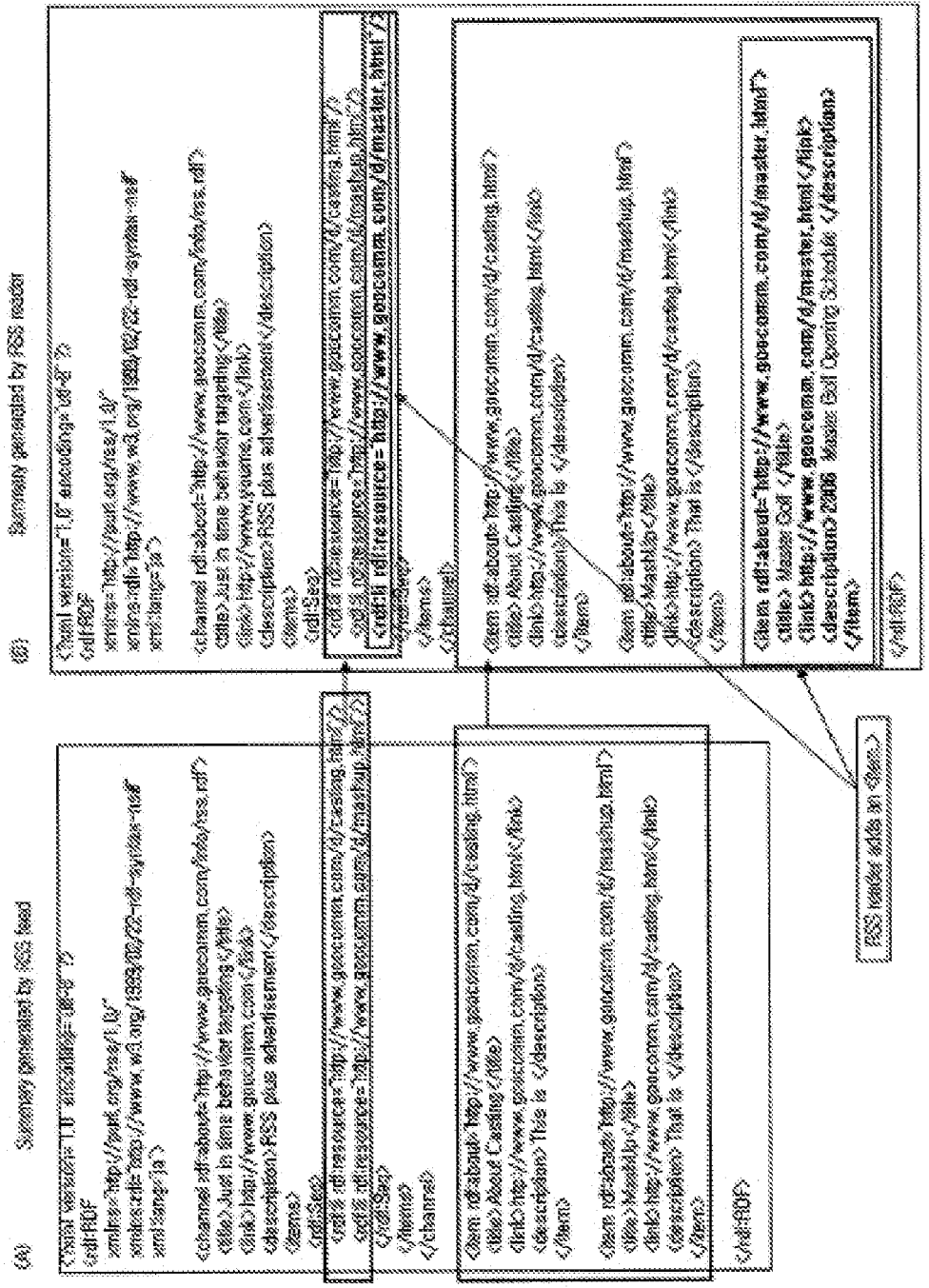
FIG. 18 shows an example for applying an advertisement adding method according to an embodiment of the present invention to a really simple syndication (RSS) case.

FIG. 18 shows an example for applying an advertisement adding method according to an embodiment of the present invention to a really simple syndication (RSS) case.

The medium for providing the RSS feed service and the RSS reader service from among the blog services is the network service medium in the system of the present invention, and it is possible for the RSS reader to add an advertisement to the summary generated by the RSS feed and display an advertisement to the RSS user by using the advertisement providing system according to the embodiment of the present invention.

As shown in (A) of FIG. 18, the RSS feed generates an XML text type summary based on the RSS rule, and the summary of each reported article is generated in the <item> tags. As shown in (B) of FIG. 18, the RSS reader adds an <item> for an advertisement in the XML type summary generated by each RSS feed.

(B) of FIG. 18 shows an example of adding and displaying an advertisement <item> of [master golf] in the highest rank from among the advertisement contents stored in the advertisement information database corresponding to the [golf] category that is the advertisement category in the highest rank of preference information of the RSS reader user.

An example of adding an advertisement applicable to the general blog will now be described. In the case of the general blog, blog an advertisement space for displaying the advertisement is preinstalled in the blog page, and a user information acquirer 122 for acquiring information on the user who receives the blog service is installed in the advertisement space 에는.

In this instance, the user information acquirer 122 receives advertisement insertion HTML text from the advertisement system according to the embodiment of the present invention, and inserts the same text in the advertisement space at which the user information acquirer 122 is located. In this instance, the advertisement insertion text has the structure of <a href="advertisement link">advertisement data</a>, and the blog service medium analyzes the inserted text and displays an advertisement.

As described above, according to the embodiment of the present invention, based on the user preference information acquired from the browser reading history and preference information registered in advance, the priority of the corresponding preference information is set to have a high rank to thus update the current preference information of the data addresser or the data addressee in real-time. According to the embodiment of the present invention, an advertisement matched with the field of interests of the data addresser or the data addressee is generated in real-time and the generated advertisement is added to the information exchanged between the data addresser and the data addressee, thereby maximizing advertisement effects.

The above-described embodiments can be realized through a program for realizing functions corresponding to the configuration of the embodiments or a recording medium for recording the program in addition to through the above-described device and/or method, which is easily realized by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

According to the present invention, advertisement effects are maximized by generating in real-time an advertisement matched with the current field of interests of the data addresser or data addressee and adding the generated advertisement to information exchanged between the data addresser and the data addressee.

What is claimed is:

1. A method of providing advertisement information, the method comprising:
   (a-1) providing a processor that is connected to (i) a user information database that includes a plurality of advertisement categories and a plurality of priority rankings associated with the plurality of advertisement categories, (ii) an advertisement information database that includes a plurality of advertisement contents and (iii) a network service medium;
   (a-2) using the processor to send a request for information about a data addresser to the user information database;
   (a-3) using the processor to receive the information about the data addresser from the user information database in response to the request;
   (b) using the processor to acquire, from the user information database, an advertisement category with the highest priority ranking that matches a field of interests of the data addresser and a contents type selected by the data addresser;
   (c) using the processor to update a priority ranking of an advertisement category recorded in the user information database;
   (d-1) using the processor to submit an inquiry to the advertisement information database based on the advertisement category with the highest priority ranking and the contents type selected by the data addresser; and
   (d-2) using the processor to acquire, from the advertisement information database, advertisement contents with the highest priority ranking that match the advertisement category with the highest priority ranking,
   wherein the request for information about the data addresser is sent to the user information database when the data addresser transmits data to a data addressee.

2. The method of claim 1, further comprising using the processor to:
   (e) update a priority ranking of an advertisement contents that is stored in the advertisement information database and corresponds to the advertisement category with the highest priority ranking;
   (f-1) link an advertisement ID and a user ID to the acquired advertisement contents with the highest priority ranking; and
   (f-2) generate an advertisement.

3. The method of claim 2, further comprising using the processor to:
   (g) transmit, to the data addresser, a confirmation message confirming completion of data transmission, the confirmation message including the advertisement, wherein the advertisement is compatible with a data structure of the network service medium.

4. The method of claim 2, wherein the step (e) comprises lowering a priority ranking of the advertisement contents currently with the highest priority to have the lowest priority ranking, and advancing priority rankings of advertisement contents that do not have the highest priority ranking.

5. The method of claim 1, wherein the step (b) comprises:
   checking whether the data addresser is a permission user based on the information about the data addresser received from the user information database;
   determining whether a number of daily transmissions to the data addresser exceeds a daily transmission limit when the data addresser is a permission user; and
   acquiring the advertisement category with the highest priority ranking and the contents type selected by the data addresser from the user information database when the number of daily transmissions does not exceed the daily transmission limit,
   wherein a permission user is a data addresser who permitted transmission of advertisement contents to the data addresser.

6. The method of claim 1, wherein the step (c) comprises lowering a priority ranking of the advertisement category with the highest priority to have the lowest priority ranking, and advancing priority rankings of advertisement categories that do not have the highest priority ranking.

7. A method of providing advertisement information, the method comprising:
   (a-1) providing a processor that is connected to (i) a user information database that includes a plurality of advertisement categories and a plurality of priority rankings associated with the plurality of advertisement categories, (ii) an advertisement information database that includes a plurality of advertisement contents and (iii) a network service medium;
   (a-2) usinq the processor to send a request for information about a data addressee to the user information database;
   (a-3) using the processor to receive the information about the data addressee from the user information database;
   (b) using the processor to check whether the data addressee is a permission user based on the received information about the data addressee;
   (c) usinq the processor to acquire, from the user information database, an advertisement category with the highest priority ranking that matches a field of interests of the data addressee and a contents type selected by the data addressee when the data addressee is a permission user; and (d-1) usinq the processor to submit an inquiry to the advertisement information database based on the advertisement category with the highest priority ranking and the contents type selected by the data addressee; and
(d-2) using the processor to acquire, from the advertisement information database, advertisement contents with the highest priority ranking that match the advertisement category with the highest priority ranking,
wherein the request for information about the data addressee is sent to the user information database when a data addresser transmits data to a data addressee; and
wherein a permission user is a data addressee who permitted transmission of advertisement contents to the data addressee.

8. The method of claim 7, further comprising using the processor to:
(e) update a priority ranking of an advertisement category recorded in the user information database; and
(f) update priority ranking of an advertisement contents that is stored in the advertisement information database and corresponds to the advertisement category with the highest priority ranking.

9. The method of claim 8, further comprising using the processor to:
(g-1) link an advertisement ID and a user ID to the acquired advertisement contents with the highest priority ranking;
(g-2) generate an advertisement;
(h) receive supplemental data to which the advertisement will be added from a data receiving server of the network service medium; and
(i) add the generated advertisement to the received supplemental data such that the supplemental data with the added advertisement is compatible with a data structure of the network service medium.

10. The method of claim 8, wherein the step (e) comprises lowering a priority ranking of the advertisement category with of the highest priority to have the lowest priority ranking, and advancing priority rankings of advertisement categories that do not have the highest priority ranking.

11. The method of claim 8, wherein the step (f) comprises lowering a priority ranking of the advertisement contents currently with the highest priority to have the lowest priority ranking, and advancing priority rankings of advertisement contents that do not have the highest priority ranking.

12. The method of 7, wherein the step (c) comprises:
determining whether a number of daily advertisements received by the data addressee exceeds a daily limit of advertisements when the data addressee is a permission user; and
acquiring the advertisement category with the highest priority ranking and the selected contents type from the user information database when the number of daily advertisements does not exceed the daily limit.

13. The method of claim 1, wherein:
the advertisement contents are provided to the data addresser when the data is transmitted from the data addresser to the data addressee;
the data comprises (i) an electronic mail transmitted to the data addressee according to an electronic mail address assigned to the data addressee or (ii) a message transmitted to the data addressee according to a phone number assigned to the data addressee; and
the method further comprises using the processor to provide the advertisement contents with the highest priority ranking that match the advertisement category with the highest priority ranking to the data addresser by including the advertisement contents in an electronic mail or message that is transmitted to the data addresser.

14. The method of claim 13, wherein the data addresser receives the electronic mail that includes the advertisement contents after the data addresser transmits the data to the data addressee.

15. The method of claim 13, wherein the data addresser sender receives the message that includes the advertisement contents after the data addresser transmits the data to the data addressee.

16. The method of claim 15, wherein the message that includes the advertisement contents comprises a short message service (SMS) message.

17. The method of claim 7, wherein:
the advertisement contents are provided to the data addressee when the data is transmitted from the data addresser to the data addressee;
the data comprises (i) an electronic mail transmitted to the data addressee according to an electronic mail address assigned to the data addressee or (ii) a message transmitted to the data addressee according to a phone number assigned to the data addressee; and
the method further comprises using the processor to provide the advertisement contents with the highest priority ranking that match the advertisement category with the highest plurality ranking to the data addressee by including the advertisement contents in the electronic mail or message that is transmitted to the data addressee.

18. The method of claim 17, wherein the electronic mail that is transmitted to the data addressee includes a message portion and an advertisement portion including the advertisement contents with the highest priority ranking that match the advertisement category with the highest plurality ranking.

19. The method of claim 17, wherein the message that is transmitted to the data addressee includes a message portion and an advertisement portion including the advertisement contents with the highest priority ranking that match the advertisement category with the highest plurality ranking.

20. The method of claim 19, wherein the message that includes the advertisement contents comprises a short message service (SMS) message.

\* \* \* \* \*